US008825118B2

(12) United States Patent
Kim et al.

(10) Patent No.: US 8,825,118 B2
(45) Date of Patent: Sep. 2, 2014

(54) MOBILE TERMINAL AND METHOD FOR CONTROLLING THE SAME

(75) Inventors: Johghawn Kim, Incheon (KR); Sekwon Park, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 196 days.

(21) Appl. No.: 13/157,861

(22) Filed: Jun. 10, 2011

(65) Prior Publication Data

US 2012/0115549 A1 May 10, 2012

(30) Foreign Application Priority Data

Nov. 9, 2010 (KR) .................. 10-2010-0110921

(51) Int. Cl.
*H04B 1/38* (2006.01)

(52) U.S. Cl.
USPC .......................................... 455/573; 455/41.1

(58) Field of Classification Search
USPC ............. 455/418–420, 550.1, 566, 572–574, 455/41.1–41.3; 320/106–108; 348/553
See application file for complete search history.

(56) References Cited

U.S. PATENT DOCUMENTS

| 2007/0271525 | A1* | 11/2007 | Han et al. ...................... 715/786 |
| 2008/0155159 | A1* | 6/2008 | Rivas et al. .................... 710/305 |
| 2008/0254822 | A1* | 10/2008 | Tilley .......................... 455/550.1 |
| 2008/0258679 | A1* | 10/2008 | Manico et al. ................ 320/106 |
| 2009/0058361 | A1* | 3/2009 | John ............................. 320/128 |
| 2009/0146608 | A1* | 6/2009 | Lee .............................. 320/108 |
| 2010/0003950 | A1* | 1/2010 | Ray et al. ..................... 455/404.1 |
| 2010/0039066 | A1* | 2/2010 | Yuan et al. .................... 320/108 |
| 2010/0042733 | A1* | 2/2010 | Jeffrey .......................... 709/228 |
| 2010/0141839 | A1* | 6/2010 | Supran et al. ................. 348/553 |
| 2011/0136550 | A1* | 6/2011 | Maugars ....................... 455/573 |
| 2011/0230209 | A1* | 9/2011 | Kilian .......................... 455/456.3 |
| 2011/0248665 | A1* | 10/2011 | Smith et al. .................. 320/101 |

* cited by examiner

*Primary Examiner* — Daniel Lai
(74) *Attorney, Agent, or Firm* — KED & Associates LLP

(57) ABSTRACT

A mobile terminal and a method for controlling the same are disclosed, which can connect communication with a preset external device when a battery of the mobile terminal is charged via a wireless charging pad, transmit information of the mobile terminal to the preset external device and output the information of the mobile terminal via the external device.

22 Claims, 33 Drawing Sheets

(a)

(b)

(a)

(b)

Communication is connected with
AUDIO if mobile terminal is located
on second zone of wireless charging pad

MOBILE TERMINAL AND METHOD FOR CONTROLLING THE SAME

CROSS-REFERENCE TO RELATED APPLICATION(S)

This application claims priority under 35 U.S.C. §119 to Korean Application No. 10-2010-0110921, filed on Nov. 9, 2010, whose entire disclosure(s) is/are hereby incorporated by reference.

BACKGROUND

1. Field

The present invention relates to a mobile terminal, and more particularly, to a mobile terminal and controlling method thereof. Although the present invention is suitable for a wide scope of applications, it is particularly suitable for facilitating a terminal to be used in further consideration of user's convenience.

2. Background

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

A battery of the aforementioned mobile terminal requires charging.

A method for charging the battery of the mobile terminal can be classified into a wire charging method and a wireless charging method. Although the wire charging method is generally used, a wireless charging system based on electromagnetic induction phenomenon has been developed recently.

The wireless charging system charges a battery by applying a power source to a wireless charging pad that includes a coil (hereinafter, referred to as "first coil") therein and charging the battery using an induction current occurring in a coil (hereinafter, referred to as "second coil"), which is included in an internal or external battery of the mobile terminal, due to the magnetic field occurring in the first coil.

In other words, the wireless charging system can easily charge the battery by locating the mobile terminal on the wireless charging pad that generates the magnetic field.

BRIEF DESCRIPTION OF THE DRAWINGS

The embodiments will be described in detail with reference to the following drawings in which like reference numerals refer to like elements wherein.

DETAILED DESCRIPTION

Figure 1:
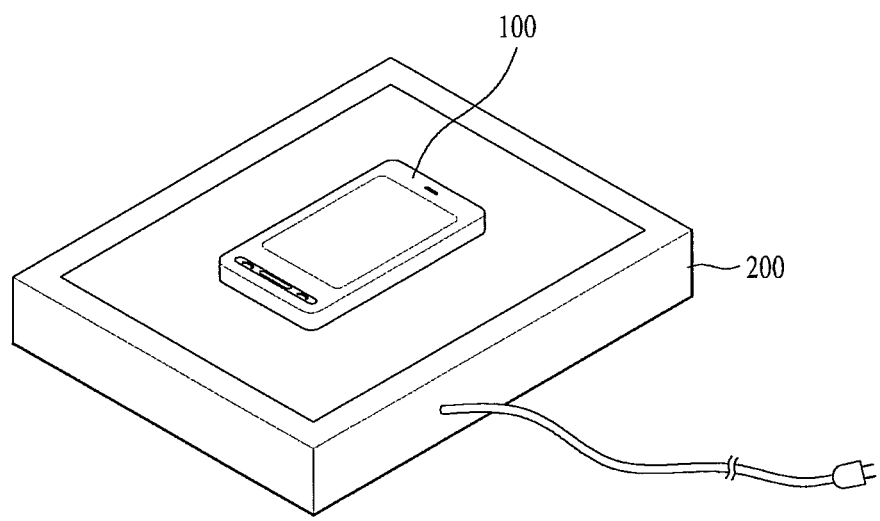
FIG. 1 is a diagram illustrating a wireless charging system according to the present invention.

Accordingly, the present invention is directed to a mobile terminal and a method for controlling the same, which substantially obviate one or more problems due to limitations and disadvantages of the related art.

An object of the present invention is to provide a mobile terminal and a method for controlling the same, which can connect communication with an external device, which is previously set, when a battery of the mobile terminal is charged through a wireless charging pad, transmit information of the mobile terminal to the external device and output the information of the mobile terminal through the external device.

Another object of the present invention is to provide a mobile terminal and a method for controlling the same, which can respectively set external devices for each of positions of one or more mobile terminals with respect to a wireless charging pad, if the mobile terminal is located on the wireless charging pad, connect communication with the external device corresponding to the position of the mobile terminal, and output information of the mobile terminal through the external device.

Still another object of the present invention is to provide a mobile terminal and a method for controlling the same, which can connect communication with an external device located at the front of the mobile terminal, among external devices located in the periphery of the mobile terminal, when a battery of the mobile terminal is charged through a wireless charging pad, and output information of the mobile terminal through the external device.

Further still another object of the present invention is to provide a mobile terminal and a method for controlling the same, which can implement a function of the mobile terminal, which is previously set, when a battery of the mobile terminal is charged through a wireless charging pad.

Further still another object of the present invention is to provide a mobile terminal and a method for controlling the same, which can respectively set functions to be performed for each position of one or more mobile terminals, and if the mobile terminal is located on a wireless charging pad, can implement a function corresponding to that position of the mobile terminal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a display unit for displaying information relating to the mobile terminal, a wireless communication unit for wireless communication, a charging unit configured to charge a battery of the mobile terminal by receiving a wireless charging power generated by an wireless charging pad when the mobile terminal is located on the wireless charging pad, a controller controlling an operation related to wireless charging of the battery, wherein the controller configured to control the wireless communication unit to connect communication with a preset external device if the battery starts to be charged via the wireless charging pad, and to control an operation related to information sharing with the preset external device.

In another aspect of the present invention, a method for controlling a mobile terminal includes charging a battery of the mobile terminal by using a wireless charging power generated by an wireless charging pad if the mobile terminal is located on the wireless charging pad, connecting communication with a preset external device if the battery starts to be charged, controlling an operation related to information sharing with the preset external device.

In still another aspect of the present invention, a mobile terminal includes a display unit for displaying information relating to the mobile terminal, a wireless communication unit for wireless communication, a charging unit configure to charge a battery of the mobile terminal by receiving a wireless charging power generated by an wireless charging pad if the mobile terminal is located on the wireless charging pad, a controller controlling an operation related to wireless charging of the battery, wherein the controller configured to acquire position information of the mobile terminal with respect to the wireless charging pad when the battery is charged, and to execute a preset function corresponding to the acquired position information.

In further still another aspect of the present invention, a method for controlling a mobile terminal includes charging a battery of the mobile terminal by using a wireless charging power generated by an wireless charging pad if the mobile terminal is located on the wireless charging pad, acquiring position information of the mobile terminal on the wireless charging pad from the wireless charging pad when the battery is charged, executing a preset function corresponding to the acquired position information.

It is to be understood that both the foregoing general description and the following detailed description of the present invention are exemplary and explanatory and are intended to provide further explanation of the invention as claimed.

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators. However, by way of non-limiting example only, further description will be with regard to a mobile terminal 100, and it should be noted that such teachings may apply equally to other types of terminals.

First of all, a wireless charging pad 200 according to the present invention will be described in detail with reference to FIGS. 1 to 3.

FIG. 1 is a diagram illustrating a wireless charging system according to the present invention.

Figure 2:
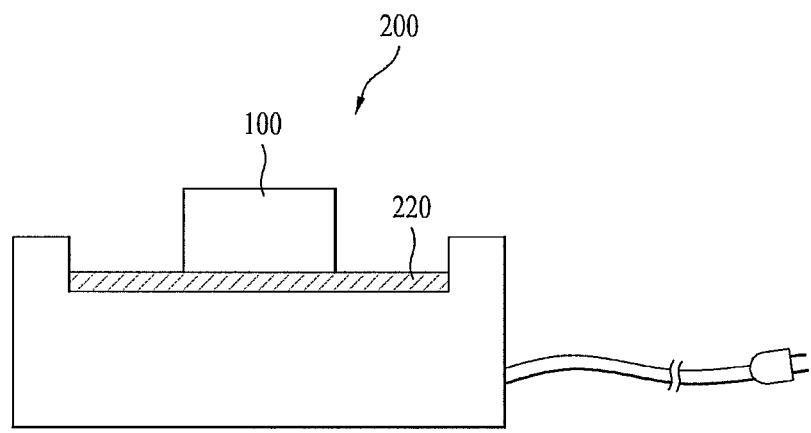
FIG. 2 is a diagram illustrating a wireless charging pad according to the present invention.
Figure 2:
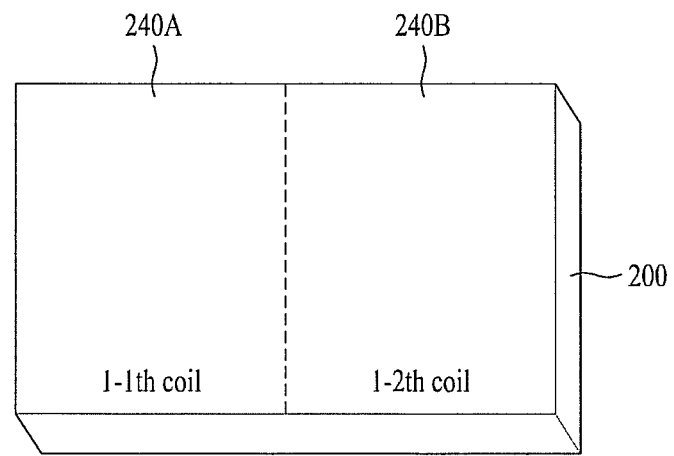

FIG. 2 is a diagram illustrating a wireless charging pad according to the present invention.

Figure 3:
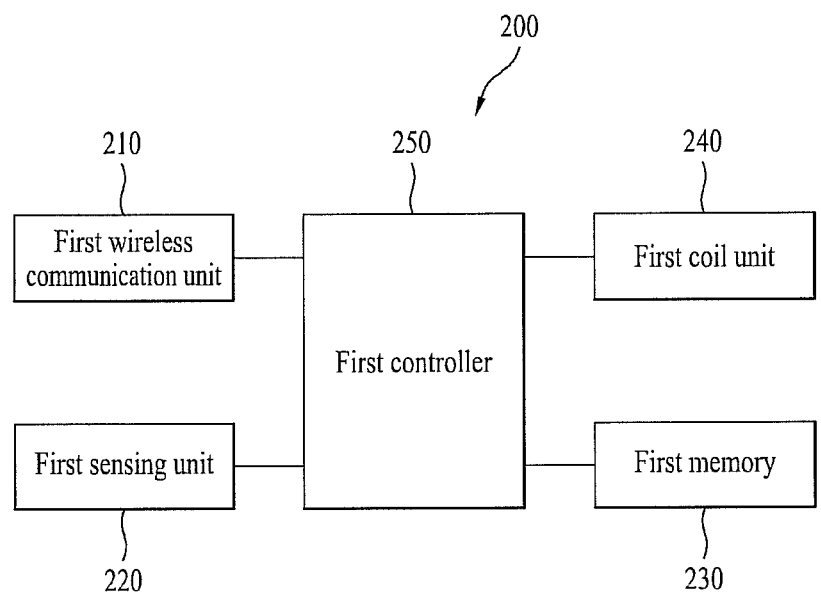
FIG. 3 is a block diagram illustrating a wireless charging pad according to the present invention.

FIG. 3 is a block diagram illustrating a wireless charging pad according to the present invention.

Referring to FIGS. 1 to 3, the wireless charging pad 200 according to the present invention means a charging device for charging a battery 190 of a mobile terminal 100 in a wireless mode.

Also, charging efficiency means a level of a power transmitted to the battery 190 of the mobile terminal 100 through electromagnetic induction phenomenon, wherein the power is supplied, for charging, from the wireless charging pad 100.

A wireless charging system according to the embodiment of the present invention may include the mobile terminal 100 and the wireless charging pad 200.

The wireless charging pad 200, as shown in (a) of FIG. 2, can include a first sensing unit 220 sensing a position based on contact of the mobile terminal 100 on the wireless charging pad 200. The first sensing unit 220 will later be described in detail with reference to FIG. 3.

Also, the wireless charging pad 200 includes a first coil unit 240 generating the magnetic field by using the supplied power. At this time, the first coil unit 240 can include one or two or more coils 240A and 240B, as shown in (b) of FIG. 2. The first coil unit 240 will later be described in detail with reference to FIG. 3.

In the mean time, the mobile terminal 100 enables wireless charging, and can include a second coil unit 194 generating an induction current, which is a wireless charging power, in accordance with the change of the magnetic field occurring in the wireless charging pad 200. The mobile terminal 100 can charge the battery 190 by using the induction current. In this case, the principle of wireless charging is based on Maxwell's equations, and is apparent to the person with ordinary skill in the art. Accordingly, the detailed description of the wireless charging will be omitted.

Referring to FIG. 3, the wireless charging pad 200 includes a first wireless communication unit 210, a first sensing unit 220, a first memory 230, a first coil unit 240, and a first controller 250.

Figure 4:
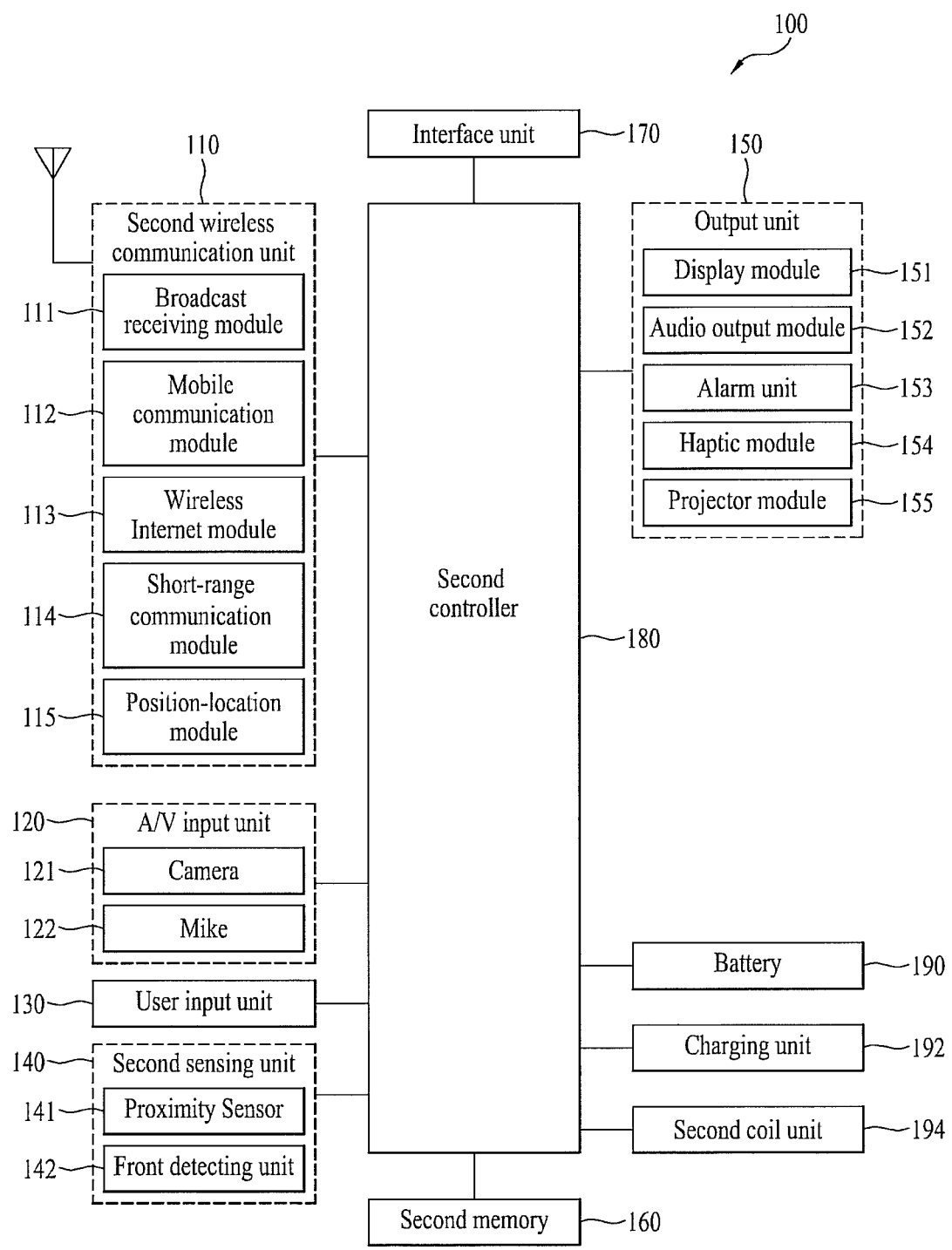
FIG. 4 is a block diagram illustrating a mobile terminal according to one embodiment of the present invention.

The first wireless communication unit 210 is intended for communication with the mobile terminal 100, and can have the same operation and the same configuration as those of a second wireless communication unit 110 of the mobile terminal 100, which will be shown in FIG. 4.

The first sensing unit 220 is intended to sense contact of the mobile terminal 100 if the mobile terminal 100 is arranged on the wireless charging pad 200, and to recognize the position of the mobile terminal 100.

A pressure sensor can be used as the first sensing unit 220. The first sensing unit 220 can be located on the wireless charging pad 200 with which the mobile terminal 100 contacts. In other words, the first sensing unit 220 can identify the position of the mobile terminal 100 when contacting with the mobile terminal 100, and can transfer the identified position of the mobile terminal 100 to the first controller 260.

At this time, the first controller 250 transmits position information of the mobile terminal 100 with respect to the wireless charging pad 200, which is transferred from the first sensing unit 220, to the mobile terminal 100 by controlling the first wireless communication unit 210 or the first coil unit 240, which will be described later.

The first coil unit 240 is one type of an electromagnet that generates the magnetic field when applying the power. For example, a solenoid may be used as the first coil unit 240.

The magnetic field generated by the first coil unit 240 induces the magnetic field to the second coil unit 194 included in the mobile terminal, and the magnetic field induced to the second coil unit 194 can generate the induction current.

At this time, the first coil unit 240 can generate the magnetic field corresponding to the position information of the mobile terminal 100 with respect to the wireless charging pad 200, which is transferred from the first sensing unit 220, under the control of the first controller 250.

In other words, the second controller 180 of the mobile terminal 100 identifies an induction current value based on the induced magnetic field as the position information of the mobile terminal 100 if the magnetic field corresponding to the position information of the mobile terminal 100, which is generated in the first coil unit 240 of the wireless charging pad 200, is induced to the second coil unit 194.

Also, as described above, a second controller 180 of the mobile terminal 100 may receive the position information of the mobile terminal 100 from the wireless charging pad 200 through the second wireless communication unit 110.

In the mean time, the first coil unit 240, as shown in (b) of FIG. 2, can include one or two or more coils 240A and 240B, and the first controller 250 can transmit position information of one of the coils 240A and 240B, which is paired with the second coil unit 194 of the mobile terminal 100, to the mobile terminal 100 through the first wireless communication unit 210 or the first sensing unit 220.

The second controller 180 of the mobile terminal 100 receives the position information of the paired coil through the second wireless communication unit 110 or the second coil unit 194, and recognizes the received position information of the coil as the position information of the mobile terminal 100 with respect to the wireless charging pad 200.

The first memory 230 stores a program required for operation of a function of the wireless charging pad 200. In particular, the first memory 230 according to the present invention can store a communication program for communication with the mobile terminal 100. At this time, the communication program may be a communication program that uses variation of the magnetic field, as described above. Also, the first memory 230 can store authentication information for identifying whether the mobile terminal 100 enables charging. The reason why that the authentication process is performed is to prevent an electronic device which is not authenticated from being damaged (for example, overheat and magnetic damage) by the magnetic field generated by the first coil unit 240.

The first controller 250 controls the overall operation of the wireless charging pad 200, controls a signal flow between inner blocks and performs a data processing function. In particular, if contact of the mobile terminal 100 is sensed through the first sensing unit 220 or the two or more coils 240A and 240B, the first controller 250 according to the present invention can identify whether the mobile terminal 100 is an authenticated device that enables charging. This is to prevent the magnetic of a credit card, transportation card, etc. from being damaged by the magnetic field when an object such as wallet not the mobile terminal 100 is arranged on the wireless charging pad.

If the mobile terminal 100 is the authenticated one, the first controller 250 identifies the position of the mobile terminal 100 with respect to the wireless charging pad 200 through the first sensing unit 220 or the two or more coils 240A and 240B, and transmits the identified position information of the mobile terminal 100 to the mobile terminal 100 through the first wireless communication unit 210 or the first coil unit 240.

FIG. 4 is a block diagram of a mobile terminal 100 in accordance with an embodiment of the present invention. FIG. 4 shows the mobile terminal 100 according to one embodiment of the present invention includes a second wireless communication unit 110, an A/V (audio/video) input unit 120, a user input unit 130, a second sensing unit 140, an output unit 150, a second memory 160, an interface unit 170, a second controller 180, a battery 190, a charging unit 192, a second coil unit 194 and the like. FIG. 4 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the second wireless communication unit 110 typically includes one or more components which permits wireless communication between the mobile terminal 100 and a wireless communication system or network within which the mobile terminal 100 is located. For instance, the second wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultrawideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 4, the audio/video (A/V) input unit 120 is configured to provide audio or video signal input to the mobile terminal 100. As shown, the NV input unit 120 includes a camera 121 and a microphone 122.

The camera 121 possesses a digital zoom and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The second sensing unit 140 provides sensing signals for controlling operations of the mobile terminal 100 using status measurements of various aspects of the mobile terminal. For instance, the second sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the second sensing unit 140 sensing the presence or absence of power provided by the power supply 190, the presence or absence of a coupling or other connection between the interface unit 170 and an external device. And, the second sensing unit 140 can include a proximity sensor 141 and a front detecting unit 142.

The front detecting unit 142 is driven under the control of the second controller 180 if the mobile terminal 100 is arranged on the wireless charging pad 200 and starts to be charged, and senses an external device located at the front of the mobile terminal 100.

At this time, the second controller 180 controls the second wireless communication unit 110 to connect communication with the external device sensed through the front detecting unit 142.

An infrared sensor or ultrasonic sensor may be used as the front detecting unit 142.

For example, if the front detecting unit 142 is the infrared sensor, an infrared light-receiving element that receives infrared rays emitted from the front detecting unit 142 is provided in the external device.

In other words, the mobile terminal 100 emits infrared rays through the front detecting unit 142 to request communication connection, and the external device connects communication with the mobile terminal 100 if the infrared rays emitted from the mobile terminal 100 are received in the infrared light-receiving element.

Also, the second controller 180 may sense the external device located at the front of the mobile terminal 100 by using the camera 121. At this time, the camera 121 may be formed on the mobile terminal 100 to take a front image in a state that the mobile terminal 100 is arranged on the wireless charging pad 200. In other words, the second controller 180 recognizes a shape of the external device, which is included in the image input through the camera 121, and controls the second wireless communication unit 110 to connect communication with the external device of which shape is recognized.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three -dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 4, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The second memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the second memory unit 160.

The second memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the second memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

Also, if the second coil unit 194 is provided outside the mobile terminal 100, the interface unit 170 may be a path that connects the second coil unit 194 with the mobile terminal 100 or the battery 190.

The second controller 180 typically controls the overall operations of the mobile terminal 100. For example, the controller 180 performs the control and processing associated with voice calls, data communications, video calls, etc. The second controller 180 may include a multimedia module 181 that provides multimedia playback. The multimedia module 181 may be configured as part of the controller 180, or implemented as a separate component.

Moreover, the second controller 180 is able to perform a pattern recognizing process for recognizing a writing input and a picture drawing input carried out on the touchscreen as characters or images, respectively.

The battery 190 supplies the power to the respective elements provided in the mobile terminal 100 under the control of the second controller 180. Also, the battery 190 charges the induction current transferred from the second coil unit 194 in accordance with the present invention.

Also, the battery 190 may be formed to include the second coil unit 194, or may be formed to include the charging unit 192 and the second coil unit 194.

The magnetic field generated by the first coil unit 240 is induced to the second coil unit 194 by the electromagnetic induction phenomenon. Then, the second coil unit 194 generates the induction current in accordance with the induced magnetic field. Since the principle of the electromagnetic induction phenomenon is apparent to those skilled in the art, its detailed description will be omitted.

In the mean time, the second coil unit 194 is preferably shielded from other electronic circuit. This is to prevent the other electronic circuit from being damaged by the magnetic field generated by the second coil unit 194.

The charging unit 192 can charge the battery 190 by using the induction current. To this end, the charging unit 192 can include a charging circuit and an overcurrent or overvoltage protective circuit.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the second memory 160, and executed by a controller or processor, such as the second controller 180.

The mobile terminal 100 and the wireless charging pad 200 according to the present invention have been described as above with reference to FIGS. 1 to 4.

Hereinafter, the embodiments of the present invention when the mobile terminal 100 charges the battery 190 through the wireless charging pad 200 will be described in detail with reference to FIGS. 5 to 33.

[First Embodiment]

The first embodiment of the present invention relates to a process of connecting communication with an external device which is previously set while the battery 190 of the mobile terminal 100 is being charged through the wireless charging pad 200, and outputting information of the mobile terminal 100 from the external device.

Hereinafter, the first embodiment of the present invention will be described in detail with reference to FIGS. 5 to 18.

First of all, a process of setting an external device for communication when the battery 190 of the mobile terminal 100 is charged through the wireless charging pad 200 will be described with reference to FIGS. 5 and 6. However, the external device may be set as default in the mobile terminal 100 without the process of FIGS. 5 and 6.

Figure 5:
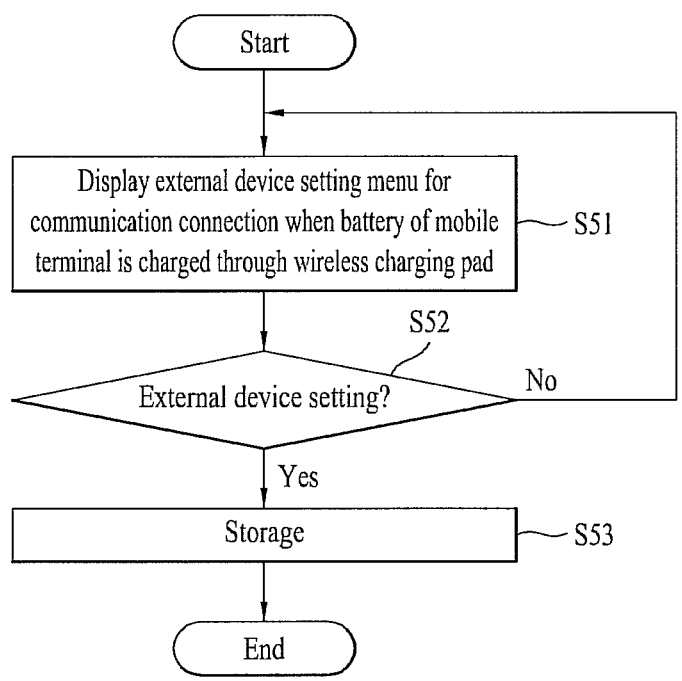
FIG. 5 is a flow chart illustrating a first embodiment of a process of setting an external device for communication when a battery of a mobile terminal is charged through a wireless charging pad in accordance with the present invention.

FIG. 5 is a flow chart illustrating a first embodiment of a process of setting an external device for communication when a battery of a mobile terminal is charged through a wireless charging pad in accordance with the present invention.

Figure 6:
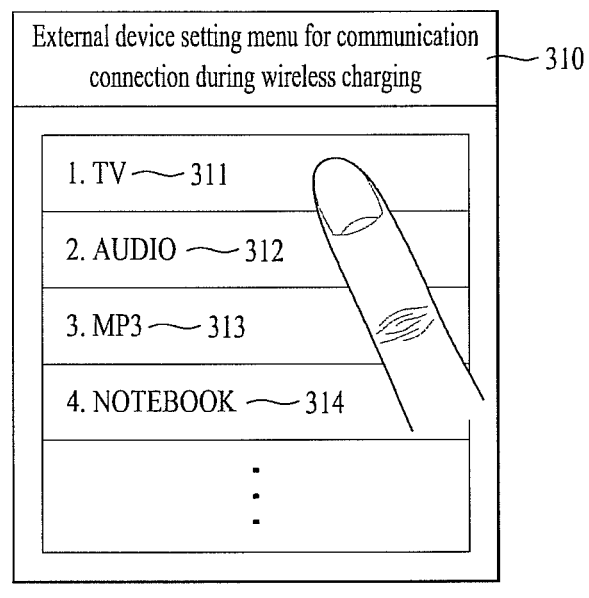
FIG. 6 is a screen state view illustrating a first embodiment of a process of setting an external device for communication when a battery of a mobile terminal is charged through a wireless charging pad in accordance with the present invention.
Figure 6:
Figure 6:
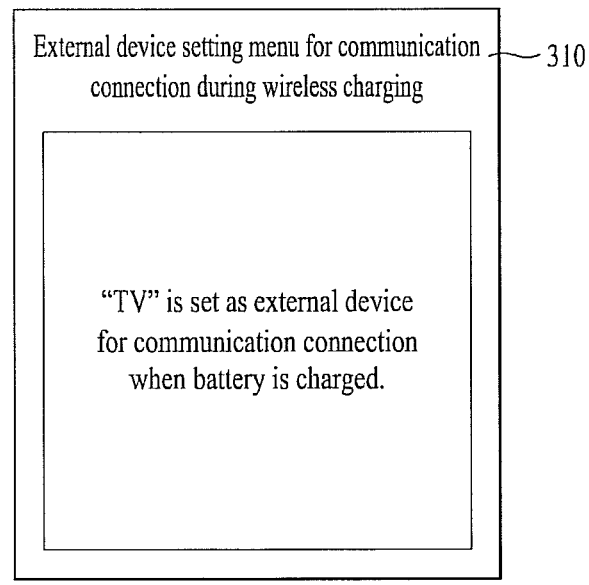

FIG. 6 is a screen state view illustrating a first embodiment of a process of setting an external device for communication when a battery of a mobile terminal is charged through a wireless charging pad in accordance with the present invention.

Referring to FIGS. 5 and 6, the second controller 180 of the mobile terminal 100 displays a menu 310, which provides a setting function of an external device for communication connection when the battery 190 of the mobile terminal 100 is charged through the wireless charging pad 200, on the display module 151 in accordance with a request of the user [S51] [(a) of FIG. 6].

At this time, external devices 311, 312, 313 and 314 shown in (a) of FIG. 6 are devices that enable communication connection with the mobile terminal 100 through mobile communication, wireless Internet and short-range communication. In the following description, it is supposed that the mobile terminal 100 is connected with the external devices 311, 312, 313 and 314 through short-range communication such as Bluetooth. Also, the external devices 311, 312, 313 and 314 may be devices previously connected with the mobile terminal 100. In this case, information required for short-range communication with the external devices 311, 312, 313 and 314 is stored in the memory 160 of the mobile terminal 100.

If the external device 311 for communication connection is set through the external device setting menu 310 when the battery 190 is charged [S52] [(a) of FIG. 6], the second controller 180 stores the set result in the second memory 160 [S53] [(b) of FIG. 6].

Next, a process of connecting communication with the external device 311 set by the process of FIGS. 5 and 6 when the battery 190 of the mobile terminal 100 is charged through the wireless charging pad and sharing information between the mobile terminal 100 and the external device 111 will be described in detail with reference to FIGS. 7 to 18.

Figure 7:
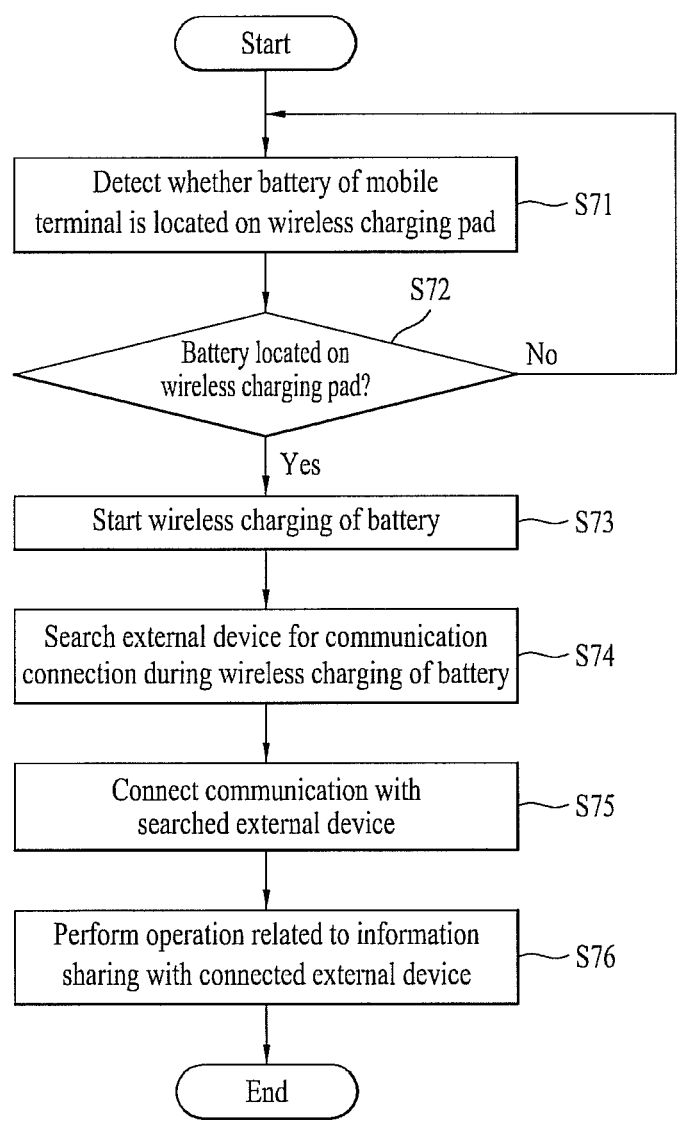
FIG. 7 is a flow chart illustrating a first embodiment of a process of sharing information with an external device, which is previously set, when a battery of a mobile terminal is charged through a wireless charging pad in accordance with the present invention.

FIG. 7 is a flow chart illustrating a first embodiment of a process of sharing information with an external device, which is previously set, when a battery of a mobile terminal is charged through a wireless charging pad in accordance with the present invention.

Referring to FIG. 7, the second controller 180 of the mobile terminal 100 senses whether the mobile terminal 100 is located on the wireless charging pad 200 [S71].

At this time, the second controller 180 can recognize that the mobile terminal 100 is located on the wireless charging pad 200 if the induction current type wireless charging power is input to the battery 190 through the second coil unit 194 and the charging unit 192.

Also, the second controller 180 can recognize that the mobile terminal 100 is located on the wireless charging pad 200 if the position information of the mobile terminal 100 with respect to the wireless charging pad 200 is received from the wireless charging pad 200 through the second wireless communication unit 110.

If the mobile terminal 100 is located on the wireless charging pad 200 [S72], the second controller 180 starts to perform wireless charging of the battery 190 by controlling the second coil unit 194 and the charging unit 192 [S73].

As described with reference to FIGS. 5 and 6, the second controller 180 searches the external device 311 for communication connection during wireless charging from the second memory 160 [S74], and connects communication with the searched external device 311 by controlling the second wireless communication unit 110 [S75].

Also, as shown in FIGS. 8 to 18, the second controller 180 performs various operations related to information sharing with the connected external device [S76].

Embodiment 1-1

The embodiment 1-1 of the present invention relates to a process of transmitting contents of a mobile terminal, which can be implemented by an external device, to the external device if communication is connected with the external device.

Figure 8:
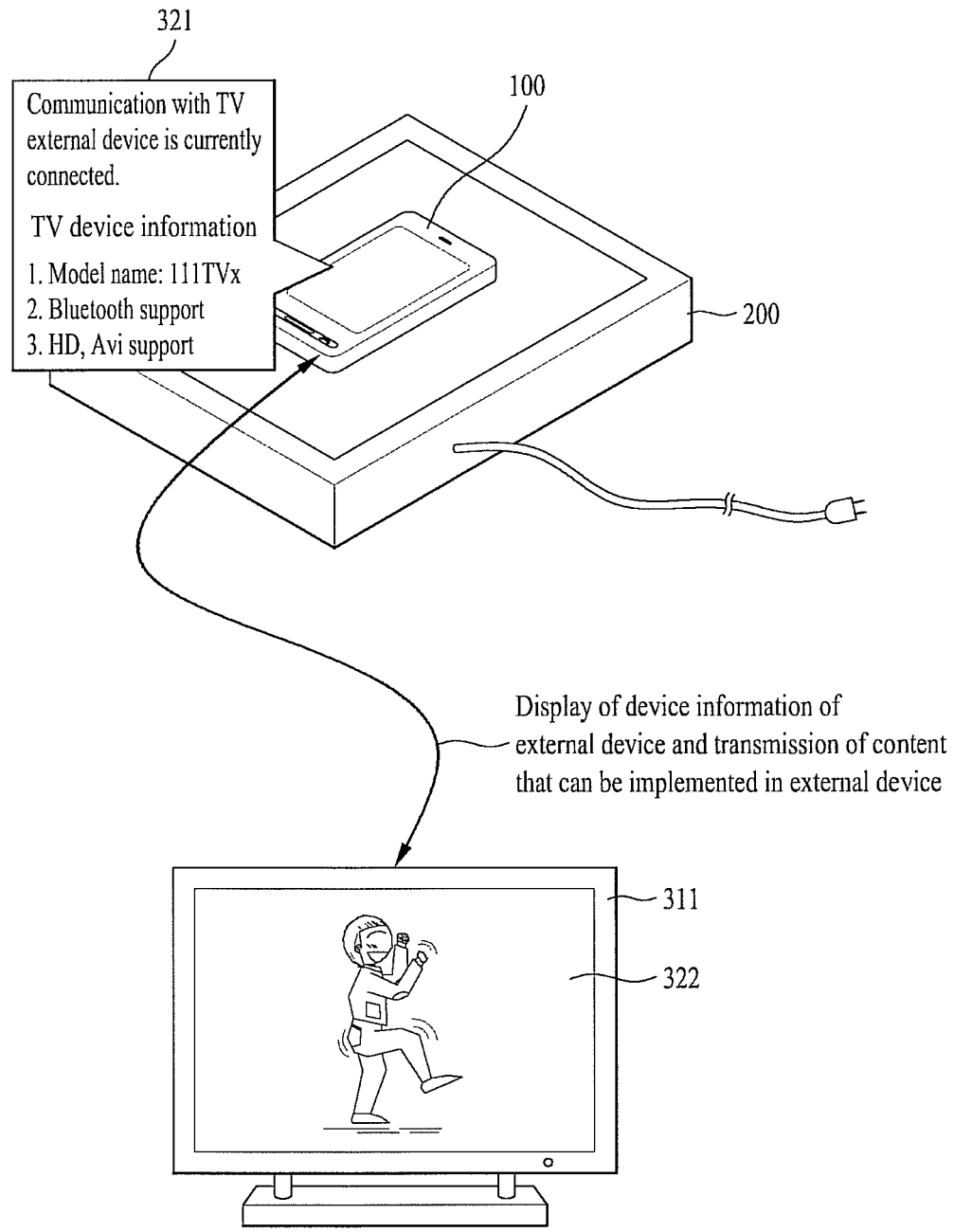
FIG. 8 is a screen state view illustrating an embodiment 1-1 of a process of sharing information with an external device, which is previously set, when a battery of a mobile terminal is charged through a wireless charging pad in accordance with the present invention.

FIG. 8 is a screen state view illustrating an embodiment 1-1 of a process of sharing information with an external device, which is previously set, when a battery of a mobile terminal is charged through a wireless charging pad in accordance with the present invention.

Referring to FIG. 8, if wireless charging of the battery 190 is started through the wireless charging pad 200, the second controller 180 connects communication with the external device 311 set by the process of FIGS. 5 and 6 by transmitting a request signal for communication connection to the external device 311 through the second wireless communication unit 110.

At this time, if communication with the external device 311 is connected, the second controller 180 transmits a signal requesting device information of the external device 311 to the external device 311 through the second wireless communication unit 110, receives the device information 321 from the external device 311, and displays the received device information on the display module 151.

Also, if communication with the external device 311 is connected without transmission operation of the device information request signal, the second controller 180 may receive the device information 321 from the external device 311.

Next, the second controller 180 searches a content 322, which can be implemented or output from the external device 311, among contents provided in the second memory 160 based on the received device information 321, and transmits the searched content 322 to the external device 311 through the second wireless communication unit 110. The external device 311 implements the received content from the mobile terminal 100.

At this time, the content may be all menu data provided in the mobile terminal 100, such as "contact address information in a phonebook", "outgoing and incoming messages", "outgoing and incoming call list", "email", "music files", "moving-picture files", "image files", "schedule information", "document files", "game files", "web page address files", "application", and "folder". The content may be frame data corresponding to a standby screen, a home screen, and a menu screen, as the case may be.

At this time, the second controller 180 can search the content 322, which can be implemented or output from the external device 311, among two or more contents previously set by the user from all the contents provided in the second memory 160.

Also, the second controller 180 may search the content 322, which can be implemented or output from the external device 311, among the contents generated or acquired for a time period previously set based on the current time in the second memory 160, based on the received device information 321.

Embodiment 1-2

The embodiment 1-2 of the present invention relates to a process of transmitting contents of a mobile terminal to an external device selectively depending on a driving-ON or driving-OFF state of a display module of the mobile terminal in a state that communication with the external device is connected.

FIGS. 9 to 12 are screen state views illustrating an embodiment 1-2 of a process of sharing information with an external device, which is previously set, when a battery of a mobile terminal is charged through a wireless charging pad in accordance with the present invention.

Figure 9:
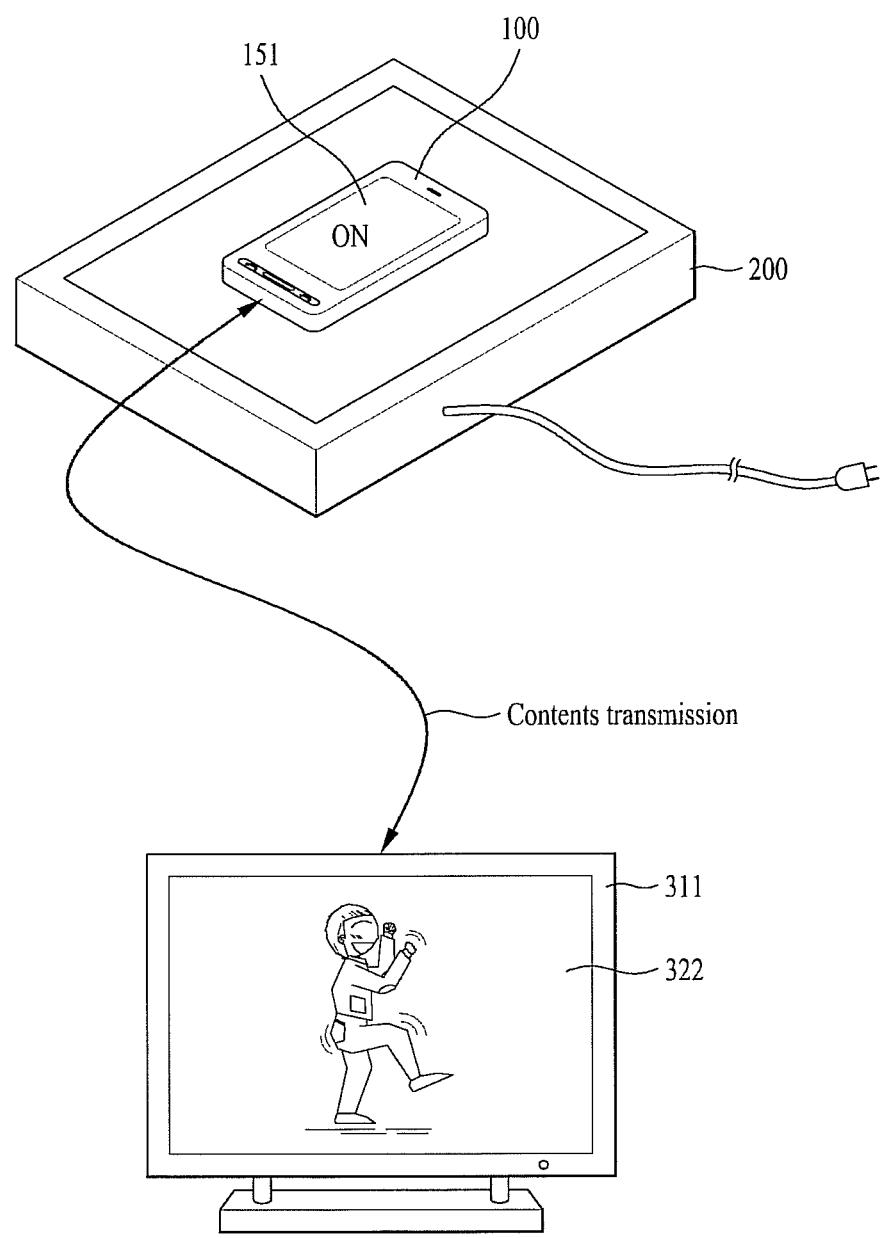
FIGS. 9 to 12 are screen state views illustrating an embodiment 1-2 of a process of sharing information with an external device, which is previously set, when a battery of a mobile terminal is charged through a wireless charging pad in accordance with the present invention.

Referring to FIG. 9, if wireless charging of the battery 190 is started through the wireless charging pad 200, the second controller 180 connects communication with the external device 311 set by the process of FIGS. 5 and 6 through the second wireless communication unit 110 by transmitting a request signal for communication connection to the external device 311.

The second controller 180 identifies a driving ON/OFF state of the display module 151 in a state that communication with the external device 311 is connected.

At this time, if the display module 151 is driven, as shown in FIG. 9, the second controller 180 transmits a content 322, which is previously set, to the external device 311 through the second wireless communication unit 110.

Figure 10:
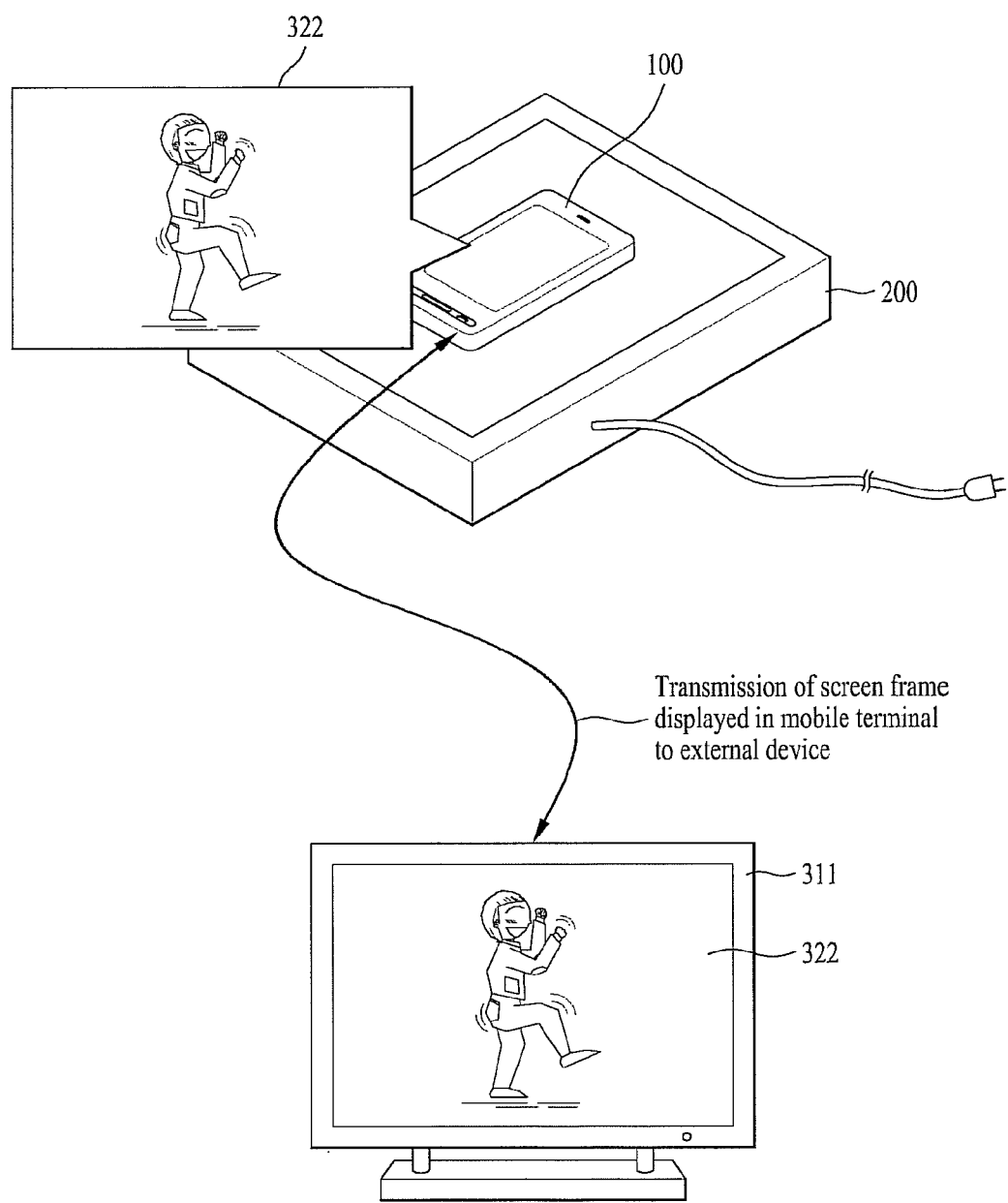

Also, if the display module 151 is driven and an execution screen of the content 322 is displayed on the display module 151 which is being driven, as shown in FIG. 10, the second controller 180 may transmit a frame of the execution screen of the content 322, which is displayed on the display module 151, to the external device 311 in real-time by controlling the second wireless communication unit 110.

At this time, the content 322 may be a content generated or acquired for a time period previously set based on the current time in the second memory 160.

In other words, the content 322 may be an image taken by the camera 121 before the user charges the battery 190 of the mobile terminal 100 or data downloaded from the external device such as PC, and the user can identify the data acquired before wireless charging through the external device 311 while wireless-charging the battery 190 of the mobile terminal 100.

Figure 11:
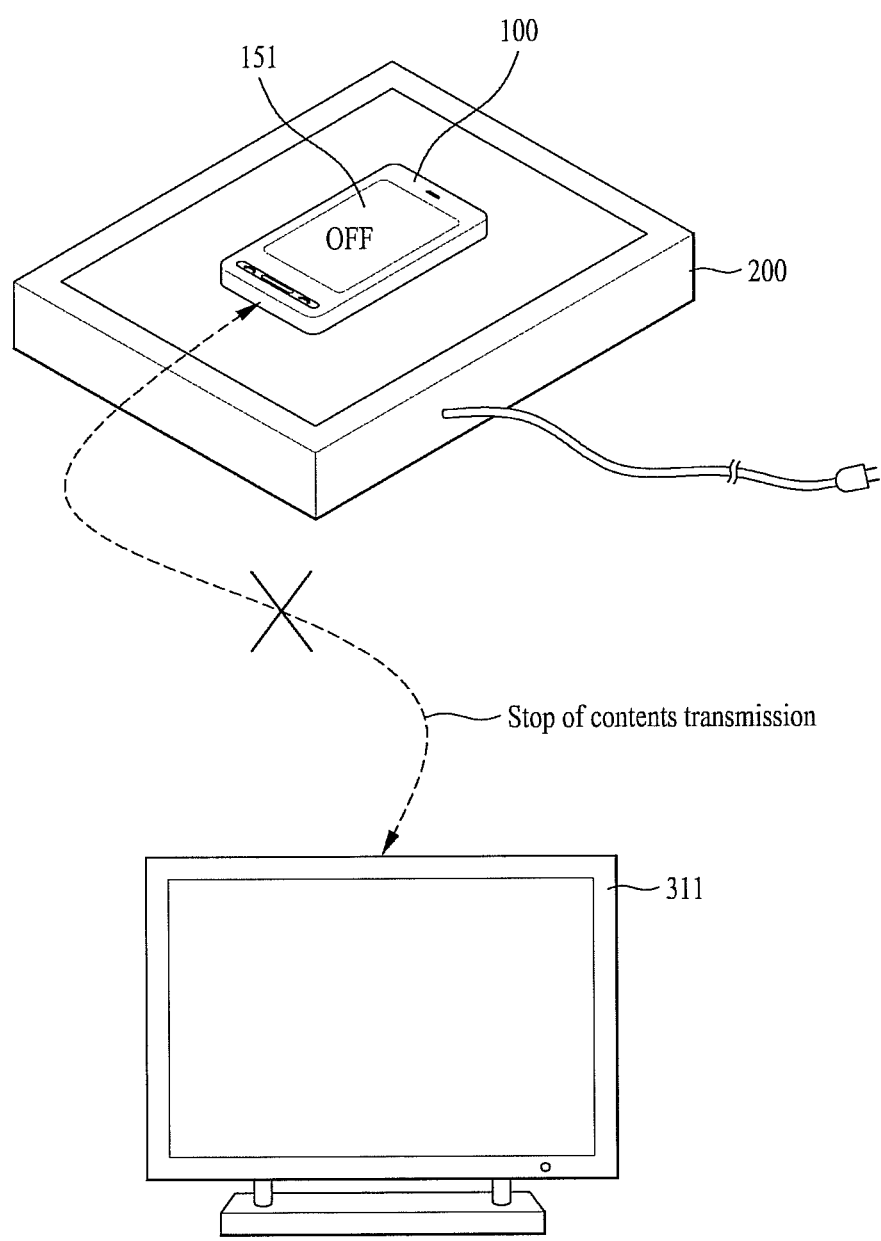

In the mean time, as shown in FIG. 11, the second controller 180 stops the transmission operation of the content 322 if the display module 151 is driven off.

In the mean time, if the mobile terminal 100 is a folder type, the second controller 180 can maintain or stop the transmission operation of the content 322 depending on an open/close state of the folder.

In other words, if the folder of the mobile terminal 100 is opened in a state that the mobile terminal 100 is connected with the external device 311, the second controller 180 transmits the content 322 to the external device 311. However, if the folder of the mobile terminal 100 is closed, the second controller 180 stops the transmission operation of the content 322.

Figure 12:
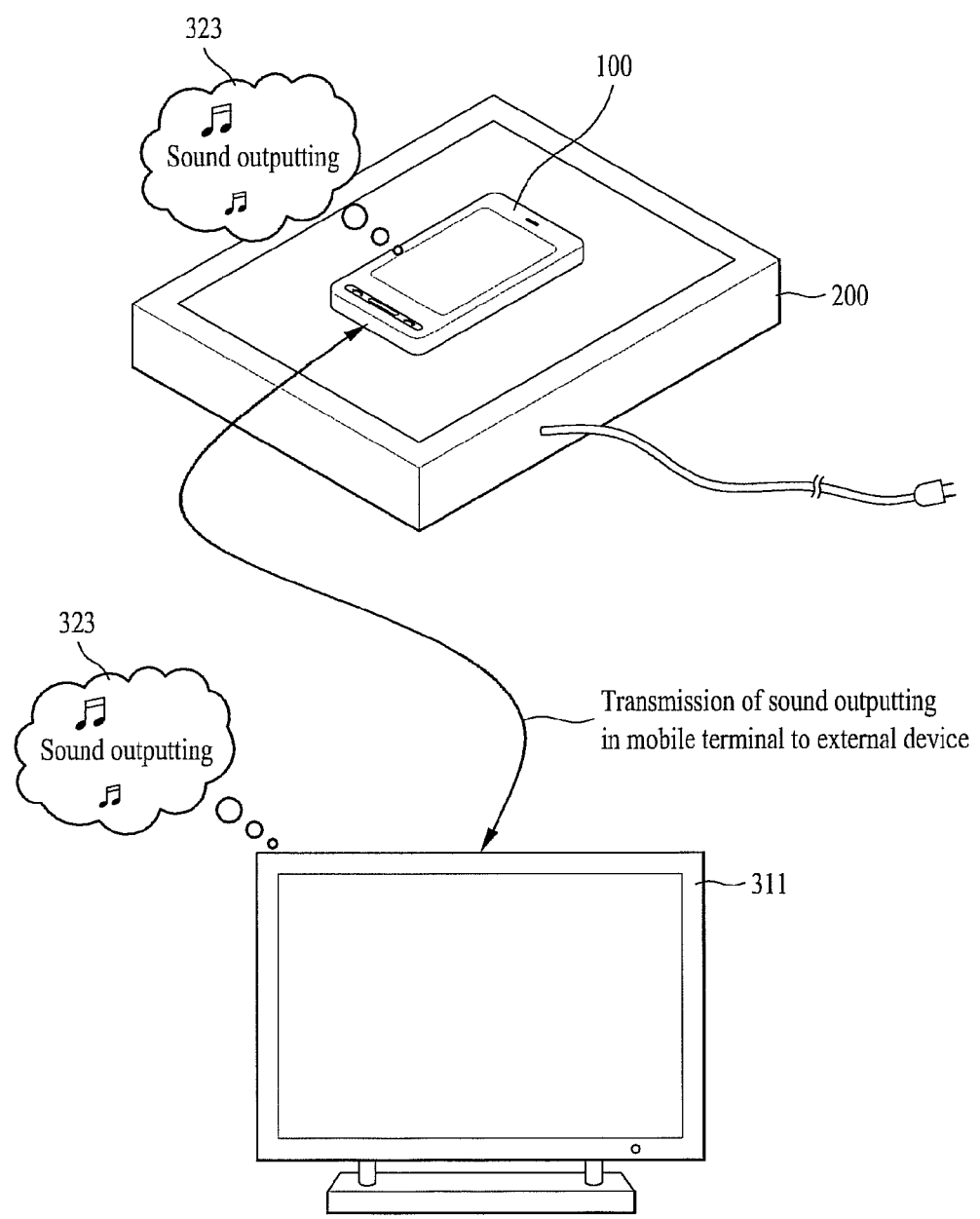

In the mean time, as shown in FIG. 12, regardless of driving of the display module 151 or folder open/close of the mobile terminal 100, if a sound 323 is being output through the audio output module 152, the second controller 180 may transmit a file of the sound 323 to the external device 311, or may transmit a frame of the output sound to the external device 311 in real-time.

Embodiment 1-3

The embodiment 1-3 of the present invention relates to a process of transmitting a current wireless charging state of a battery to an external device in a state that communication with the external device is connected.

Figure 13:
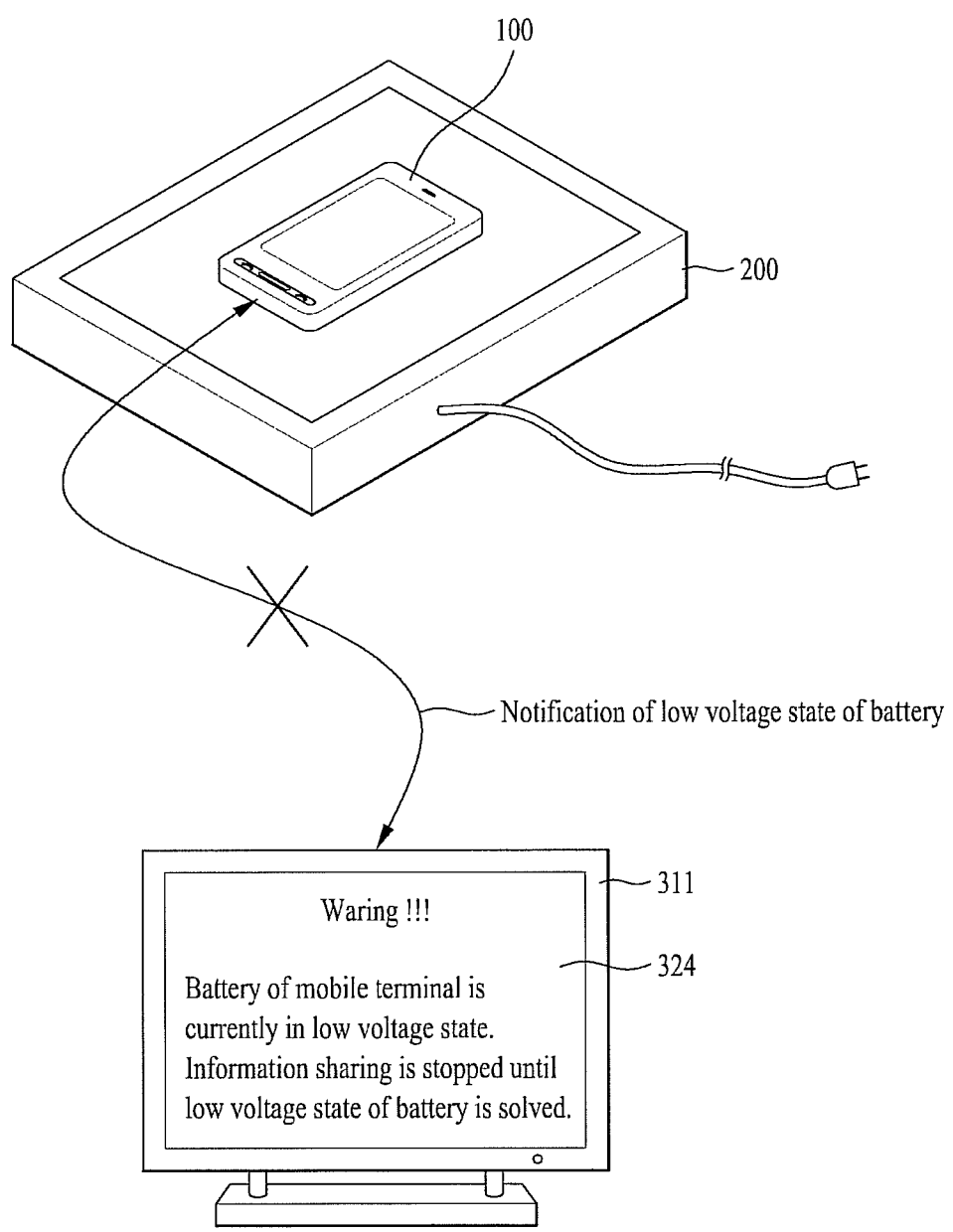
FIGS. 13 to 15 are screen state views illustrating an embodiment 1-3 of a process of sharing information with an external device, which is previously set, when a battery of a mobile terminal is charged through a wireless charging pad in accordance with the present invention.
Figure 14:
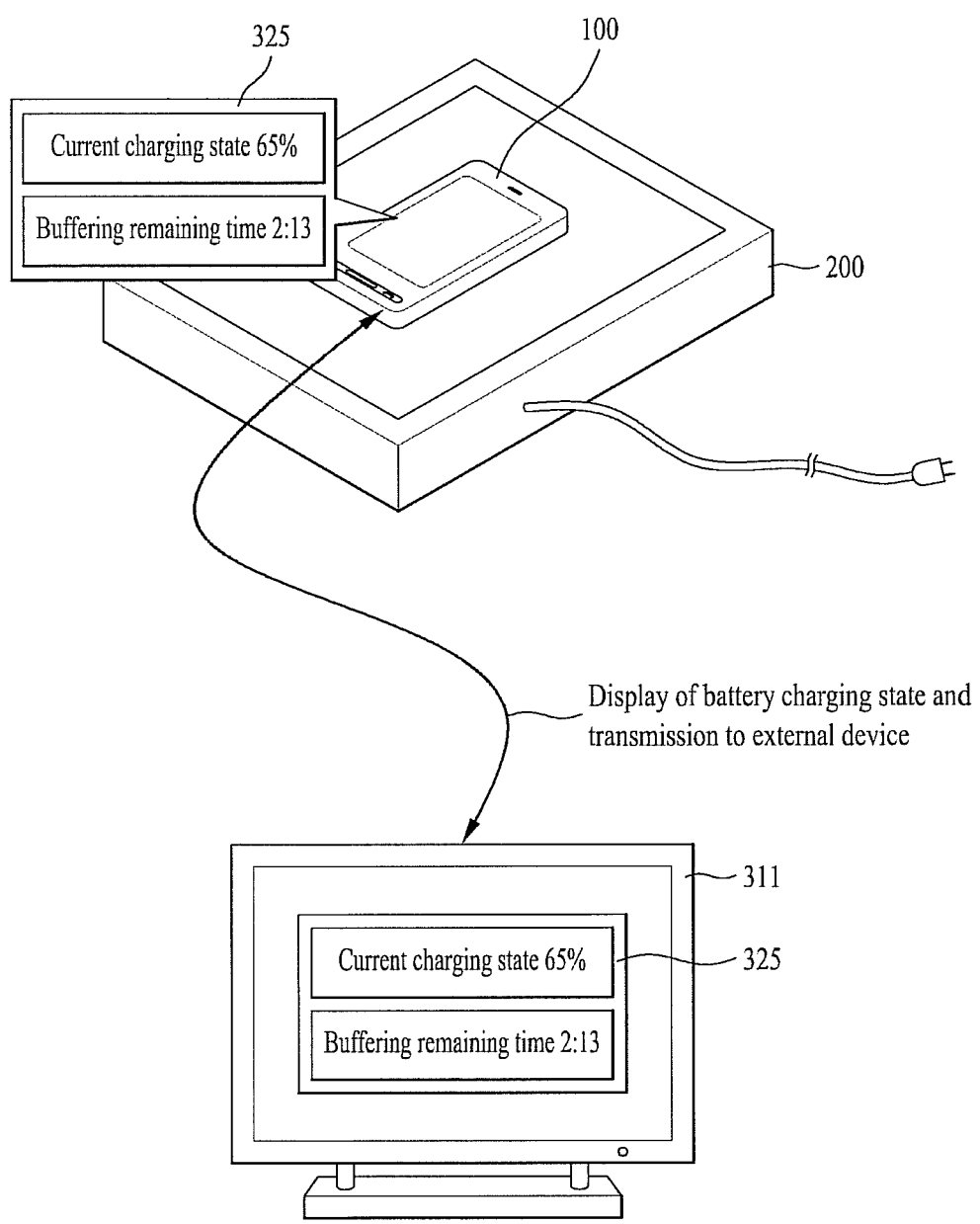
Figure 15:
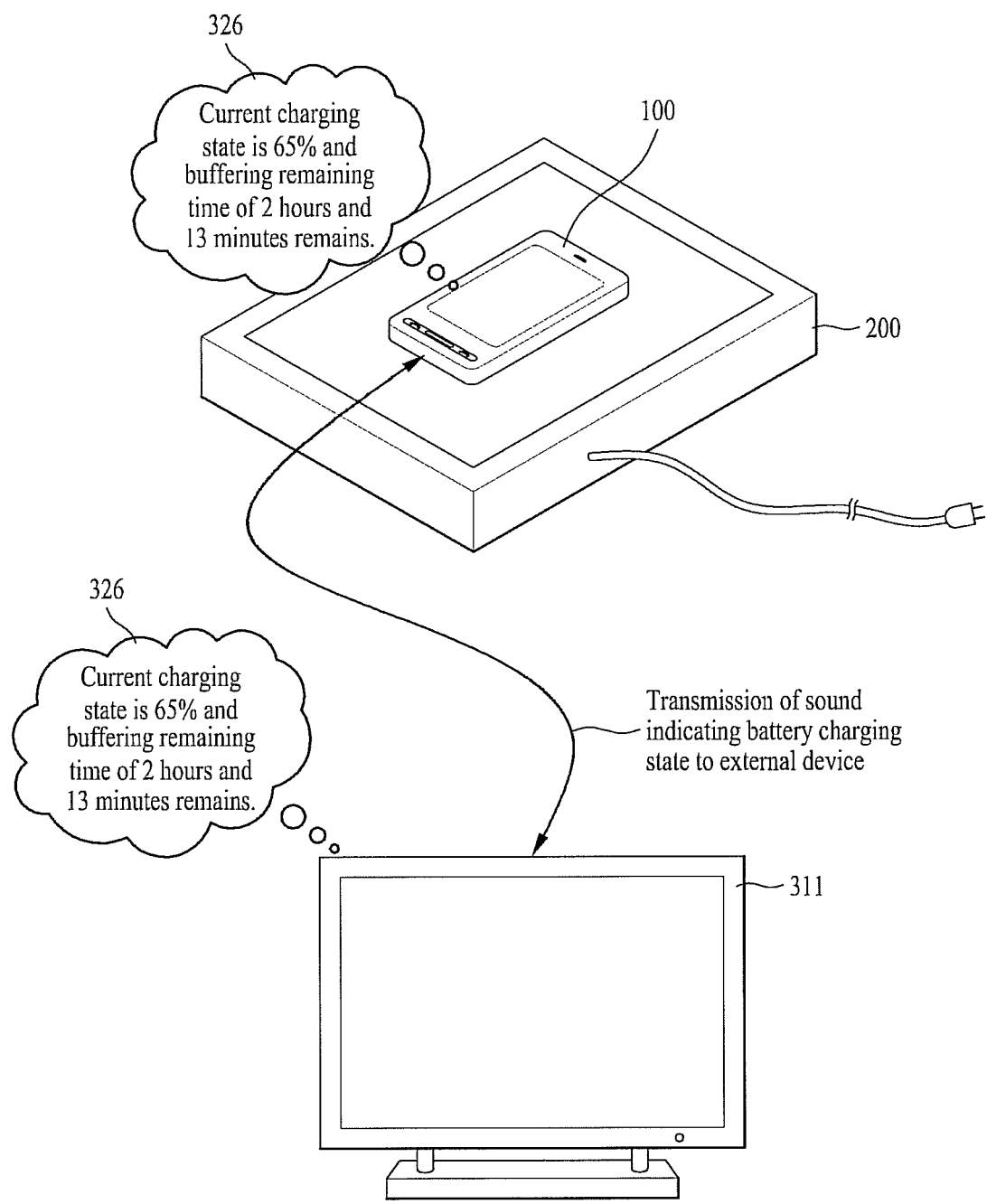

FIGS. 13 to 15 are screen state views illustrating an embodiment 1-3 of a process of sharing information with an external device, which is previously set, when a battery of a mobile terminal is charged through a wireless charging pad in accordance with the present invention.

First of all, referring to FIG. 13, if wireless charging of the battery 190 is started through the wireless charging pad 200, the second controller 180 connects communication with the external device 311 set by the process of FIGS. 5 and 6 through the second wireless communication unit 110 by transmitting a request signal for communication connection to the external device 311.

The second controller 180 tests charging efficiency of the battery 190 which is currently being wireless-charged, if communication with the external device 311 is connected. At this time, the charging efficiency means a transmission level of the magnetic field, which is generated by the wireless charging pad 200, to the mobile terminal 100 by means of the electromagnetic induction phenomenon.

If the charging efficiency of the battery 190 is less than a reference value previously set for a previously set time period, the second controller 180 generates information 324 indicating a low voltage state of the battery 190, and transmits the generated information 324 to the external device 311 to allow the external device 311 to display the information as illustrated in FIG. 13.

If transmission of the information 324 is completed, the second controller 180 stops an information sharing operation with the external device 311 until the battery 190 reaches a normal voltage state.

In other words, in FIG. 13, if the low voltage state of the battery, which is being currently wireless-charged, is sustained for a long time, since the charging time of the battery 190 becomes longer and lifespan of the battery 190 can be reduced, the second controller 180 stops the information sharing operation with the external device 311 until the charging state of the battery 190 departs from the low voltage state.

Next, referring to FIG. 14, if communication with the external device 311 is connected, the second controller 180 identifies the charging state of the battery 190 per previously set period, and transmits information 325 indicating the identified charging state to the external device 311 to allow the external device 311 to display the information 325.

Also, the second controller 180 may display the information 325 in the display 151.

At this time, the information 325 indicating the charging state can include a charging capacity of the battery 190 and a remaining time remaining until the battery 190 is fully charged.

In other words, the user can identify the charging state of the battery 190 through the external device 311.

Also, referring to FIG. 15, if communication with the external device 311 is connected, the second controller 180 may identify the charging state of the battery 190, which is being currently wireless-charged, and may transmit a sound 326, which indicates the identified charging state, to the external device 311, thereby allowing the external device 311 to output the sound 326.

Embodiment 1-4

The embodiment 1-4 of the present invention relates to a process of displaying a first remote user interface (hereinafter, referred to as 'UI') for operation control of an external device on a display module of a mobile terminal in a state that communication with the external device is connected, and controlling an operation of the external device through the first remote UI.

Figure 16:
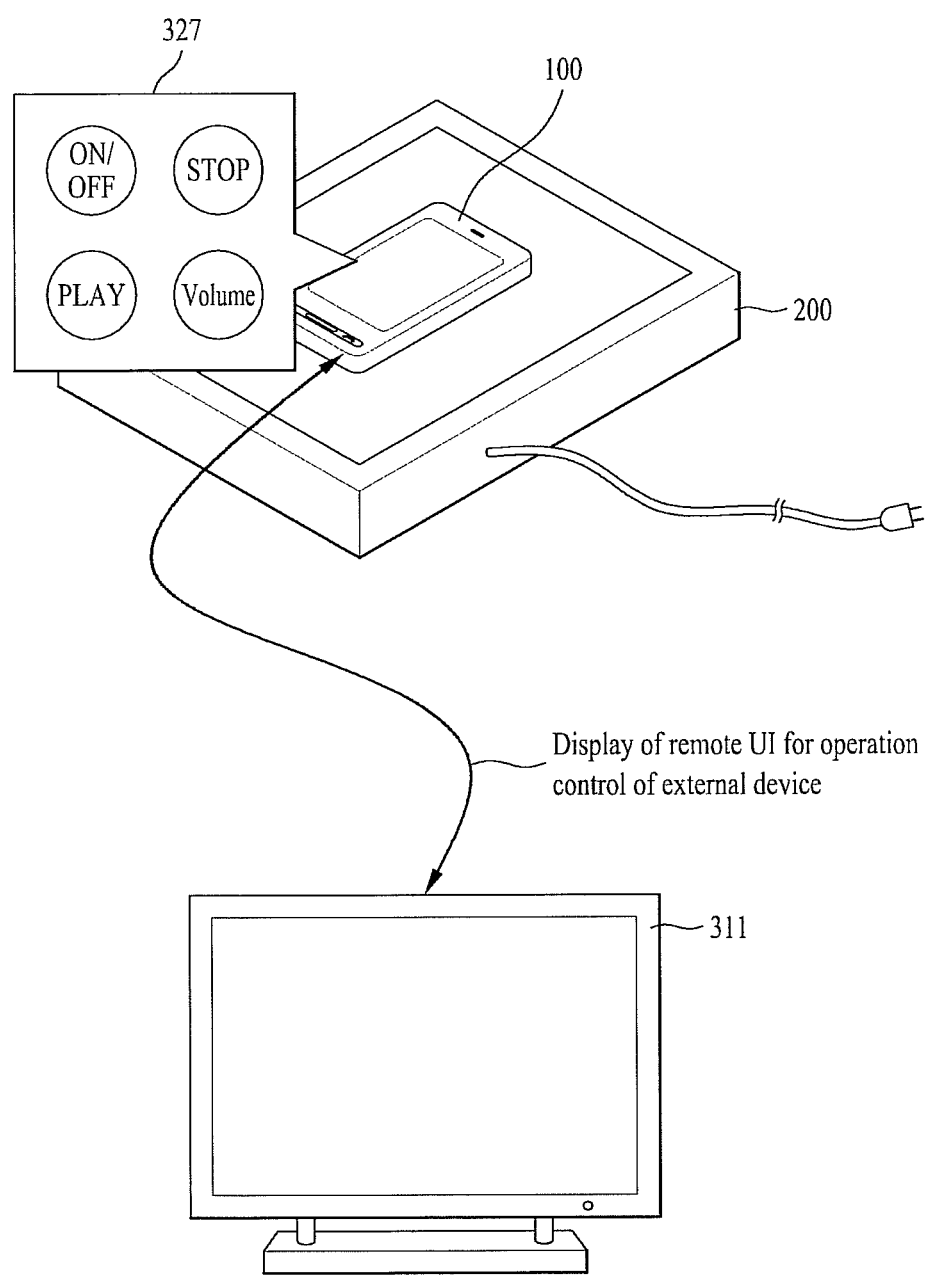
FIG. 16 is a screen state view illustrating an embodiment 1-4 of a process of sharing information with an external device, which is previously set, when a battery of a mobile terminal is charged through a wireless charging pad in accordance with the present invention.

FIG. 16 is a screen state view illustrating an embodiment 1-4 of a process of sharing information with an external device, which is previously set, when a battery of a mobile terminal is charged through a wireless charging pad in accordance with the present invention.

Referring to FIG. 16, if wireless charging of the battery 190 is started through the wireless charging pad 200, the second controller 180 connects communication with the external device 311 set by the process of FIGS. 5 and 6 through the second wireless communication unit 110 by transmitting a request signal for communication connection to the external device 311.

The second controller 180 displays a first remote UI 327 on the display module 151, wherein the first remote UI 327 is to control the operation of the external device 311 in accordance with one or more modes.

At this time, if the external device 311 is a "TV", the first remote UI 327 can be configured by keys allocated with the same control functions as those of keys provided in a remote controller of the "TV".

For example, in FIG. 16, the first remote UI 327 includes a first key for commanding Power-ON/OFF of the external device 311, a second key for commanding content play in the external device 311, a third key for commanding stop of the content which is being played in the external device 311, and a fourth key for commanding volume up/down of the content which is being played in the external device 311.

If a key for controlling a specific operation within the first remote UI 327 is input, the second controller 180 transmits a command signal for commanding the operation to the external device 311 to allow the external device 311 to perform the operation allocated to the input key.

Embodiment 1-4

The embodiment 1-4 of the present invention relates to a process of displaying a first remote user interface (hereinafter, referred to as 'UI') for operation control of an external device on a display module of a mobile terminal in a state that communication with the external device is connected, and controlling an operation of the external device through the first remote UI.

FIG. 16 is a screen state view illustrating an embodiment 1-4 of a process of sharing information with an external device, which is previously set, when a battery of a mobile terminal is charged through a wireless charging pad in accordance with the present invention.

Referring to FIG. 16, if wireless charging of the battery 190 is started through the wireless charging pad 200, the second controller 180 connects communication with the external device 311 set by the process of FIGS. 5 and 6 through the second wireless communication unit 110 by transmitting a request signal for communication connection to the external device 311.

The second controller 180 displays a first remote UI 327 on the display module 151, wherein the first remote UI 327 is to control the operation of the external device 311 in accordance with one or more modes.

At this time, if the external device 311 is a "TV", the first remote UI 327 can be configured by keys allocated with the same control functions as those of keys provided in a remote controller of the "TV".

For example, in FIG. 16, the first remote UI 327 includes a first key for commanding Power-ON/OFF of the external device 311, a second key for commanding content play in the external device 311, a third key for commanding stop of the content which is being played in the external device 311, and a fourth key for commanding volume up/down of the content which is being played in the external device 311.

If a key for controlling a specific operation within the first remote UI 327 is input, the second controller 180 transmits a command signal for commanding the operation to the external device 311 to allow the external device 311 to perform the operation allocated to the input key.

Embodiment 1-5

The embodiment 1-5 of the present invention relates to a process of transmitting a screen frame of a content, which is being implemented in a mobile terminal, and displaying a second remote UI for operation control of the content on a display module of the mobile terminal in a state that communication with the external device is connected.

Figure 17:
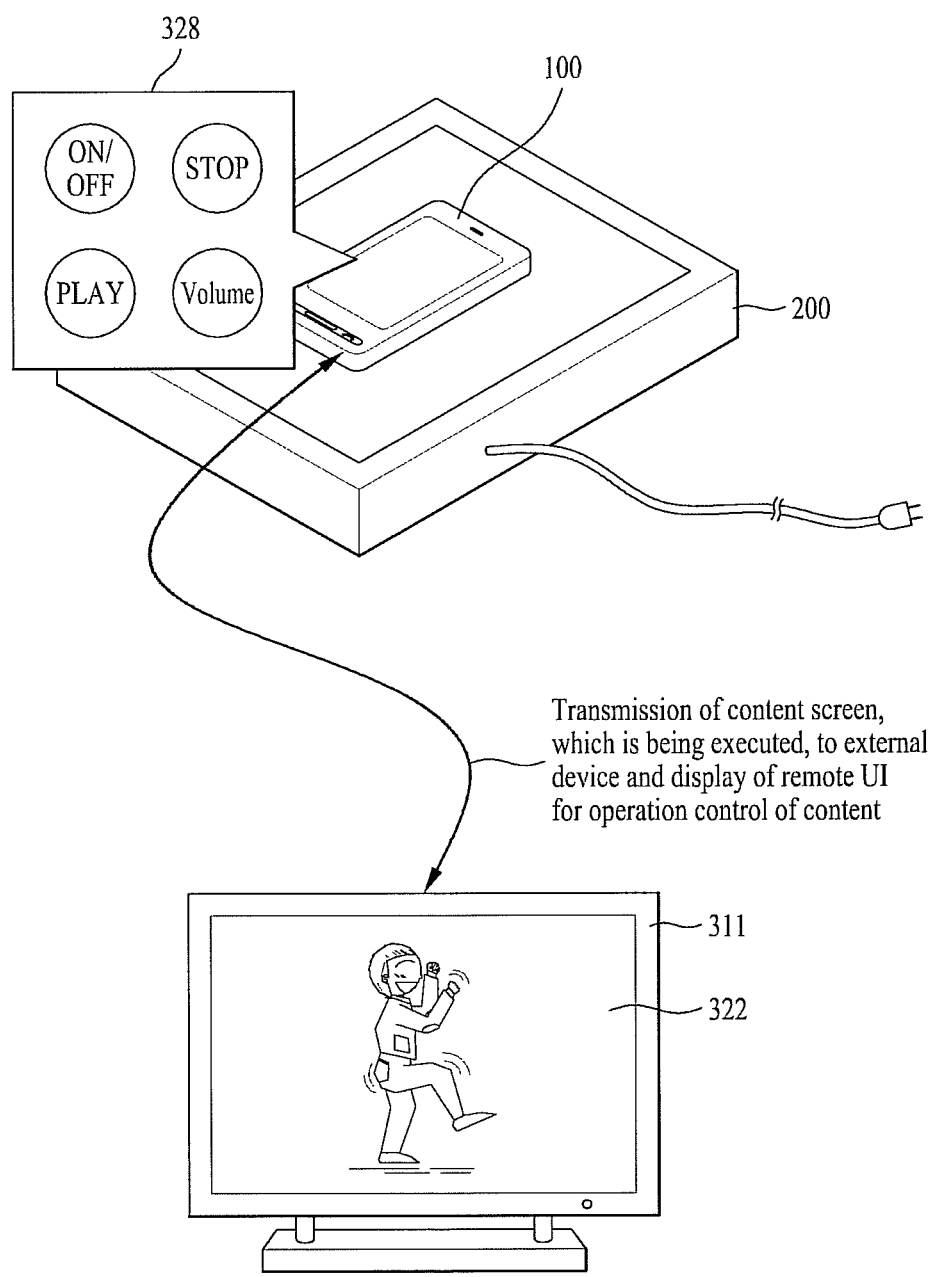
FIG. 17 is a screen state view illustrating an embodiment 1-5 of a process of sharing information with an external device, which is previously set, when a battery of a mobile terminal is charged through a wireless charging pad in accordance with the present invention.

FIG. 17 is a screen state view illustrating an embodiment 1-5 of a process of sharing information with an external device, which is previously set, when a battery of a mobile terminal is charged through a wireless charging pad in accordance with the present invention.

Referring to FIG. 17, if wireless charging of the battery 190 is started through the wireless charging pad 200, the second controller 180 connects communication with the external device 311 set by the process of FIGS. 5 and 6 through the second wireless communication unit 110 by transmitting a request signal for communication connection to the external device 311.

If a content 322 previously set or selected by the user is executed in a state that communication with the external device 311 is connected, the second controller 180 transmits a frame based on the executed screen of the content 322 to the external device 311 in real-time, and displays a second remote UI 328 on the display module 151, wherein the second remote UI 328 is to control the operation of the implemented content 322 in accordance with one or more modes.

At this time, if the content 322 corresponds to multimedia, the second remote UI 328 can be configured by keys for operation control related to playing of the multimedia.

If a key for controlling a specific operation within the second remote UI 328 is input, the second controller 180 controls the operation of the implemented content 322 to correspond to the input control key, and transmits a screen frame for implementing the content 322, in which the operation control is reflected, to the external device 311 in real-time.

Embodiment 1-6

The embodiment 1-6 of the present invention relates to a process of transmitting information, which indicates an event, to an external device if the event such as incoming call, incoming message, and alarm output occurs in a mobile terminal in a state that communication with the external device is connected.

Figure 18:
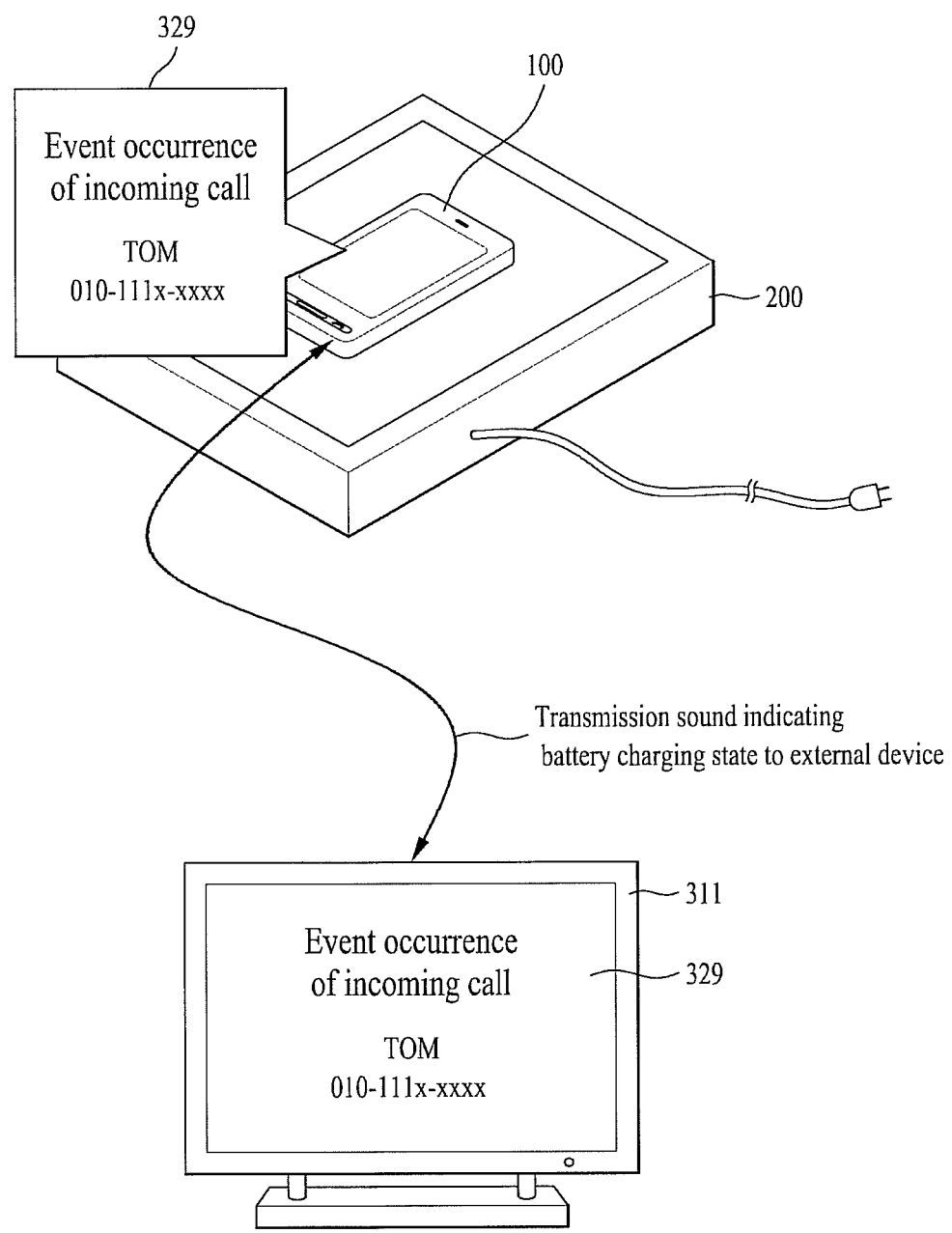
FIG. 18 is a screen state view illustrating an embodiment 1-6 of a process of sharing information with an external device, which is previously set, when a battery of a mobile terminal is charged through a wireless charging pad in accordance with the present invention.

FIG. 18 is a screen state view illustrating an embodiment 1-6 of a process of sharing information with an external device, which is previously set, when a battery of a mobile terminal is charged through a wireless charging pad in accordance with the present invention.

Referring to FIG. 18, if wireless charging of the battery 190 is started through the wireless charging pad 200, the second controller 180 connects communication with the external device 311 set by the process of FIGS. 5 and 6 through the second wireless communication unit 110 by transmitting a request signal for communication connection to the external device 311.

In a state that communication with the external device 311 is connected, if a specific event occurs in the mobile terminal 100, or if a specific event occurs while the mobile terminal is sharing information with the external device 311 connected by the process of FIGS. 7 to FIG. 17, the second controller 180 transmits information 329 indicating the occurred event to the external device 311 to allow the external device 311 to display the event.

At this time, the event may be incoming call, incoming message, alarm output, etc., and the information 329 may be text, icon, image, or actual event screen, which indicates occurrence of the event.

In FIG. 18, the event of incoming call occurs.

In other words, the user can be located in the periphery of the external device 311 not the mobile terminal 100 while the battery 190 of the mobile terminal 100 is being wireless-charged.

Accordingly, in the present invention, the mobile terminal 100 can notify the user of the event occurring therein by outputting the information 329 indicating the event to the external device 311.

The first embodiment of the present invention has been described as above with reference to FIGS. 5 to 18.

Hereinafter, the second embodiment of the present invention will be described in detail with reference to FIGS. 19 to 23.

[Second Embodiment]

The second embodiment of the present invention relates to a process of respectively setting one or more external devices for each of positions of one or more mobile terminals with respect to a wireless charging pad 200, connecting communication with the external device corresponding to the position of the mobile terminal if the mobile terminal is located on the wireless charging pad, and sharing information with the external device.

Hereinafter, the second embodiment of the present invention will be described in detail with reference to FIGS. 19 to 23.

First of all, a process of respectively setting one or more external devices for each of positions of one or more mobile terminals with respect to a wireless charging pad 200 will be described with reference to FIGS. 19 and 20.

Figure 19:
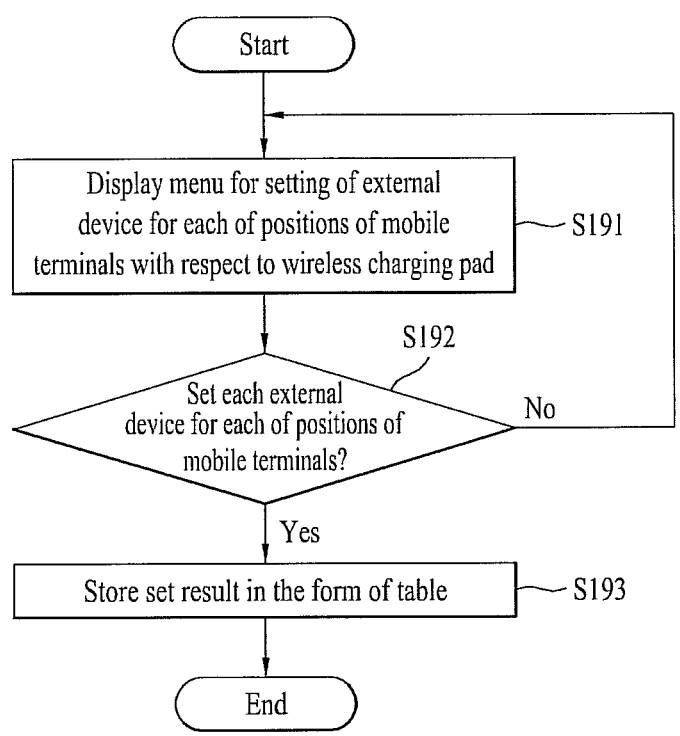
FIG. 19 is a flow chart illustrating a second embodiment of a process of respectively setting one or more external devices for each of positions of one or more mobile terminals with respect to a wireless charging pad.

FIG. 19 is a flow chart illustrating a second embodiment of a process of respectively setting one or more external devices for each of positions of one or more mobile terminals with respect to a wireless charging pad.

Figure 20:
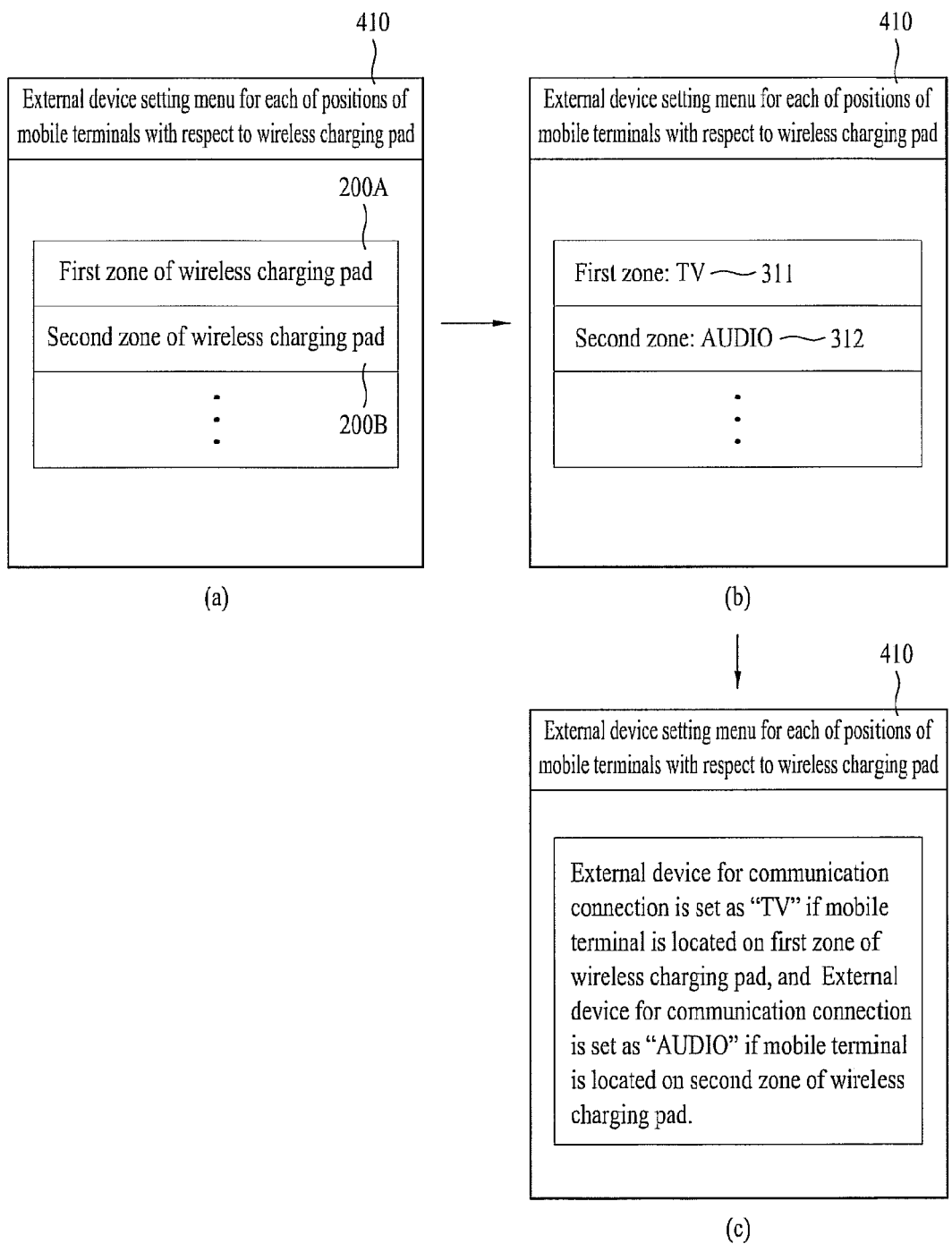
FIG. 20 is a screen state view chart illustrating a second embodiment of a process of respectively setting one or more external devices for each of positions of one or more mobile terminals with respect to a wireless charging pad.

FIG. 20 is a screen state view chart illustrating a second embodiment of a process of respectively setting one or more external devices for each of positions of one or more mobile terminals with respect to a wireless charging pad.

Referring to FIGS. 19 and 20, the second controller 180 of the mobile terminal 100 displays a menu 410, which provides a function of respectively setting one or more external devices 311 and 312 for each of positions 200A and 200B of one or more mobile terminals with respect to the wireless charging pad 200, on the display module 151 in accordance with a request of the user [S191][(a) of FIG. 20].

If the respective external devices 311 (TV) and 312 (AUDIO) are set respectively for each of the positions (first zone 200A and second zone 200B of the wireless charging pad 200) of the mobile terminals with respect to the wireless charging pad through the menu 410 [S192][(a) and (b) of FIG. 20], the second controller stores the set information in the second memory 160 in the form of table [S193][(c) of FIG. 20].

Figure 21:
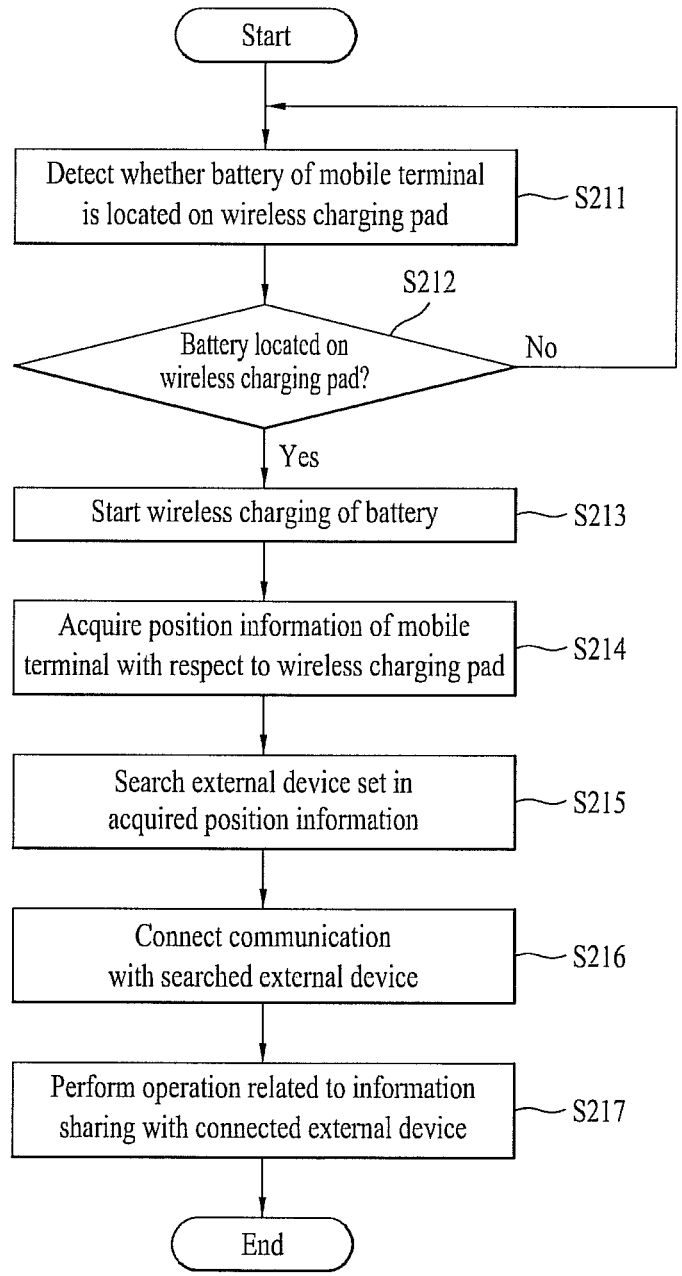
FIG. 21 is a flow chart illustrating a second embodiment of a process of connecting communication with an external device in accordance with a position of a mobile terminal with respect to a wireless charging pad.

FIG. 21 is a flow chart illustrating a second embodiment of a process of connecting communication with an external device in accordance with a position of a mobile terminal with respect to a wireless charging pad.

Figure 22:
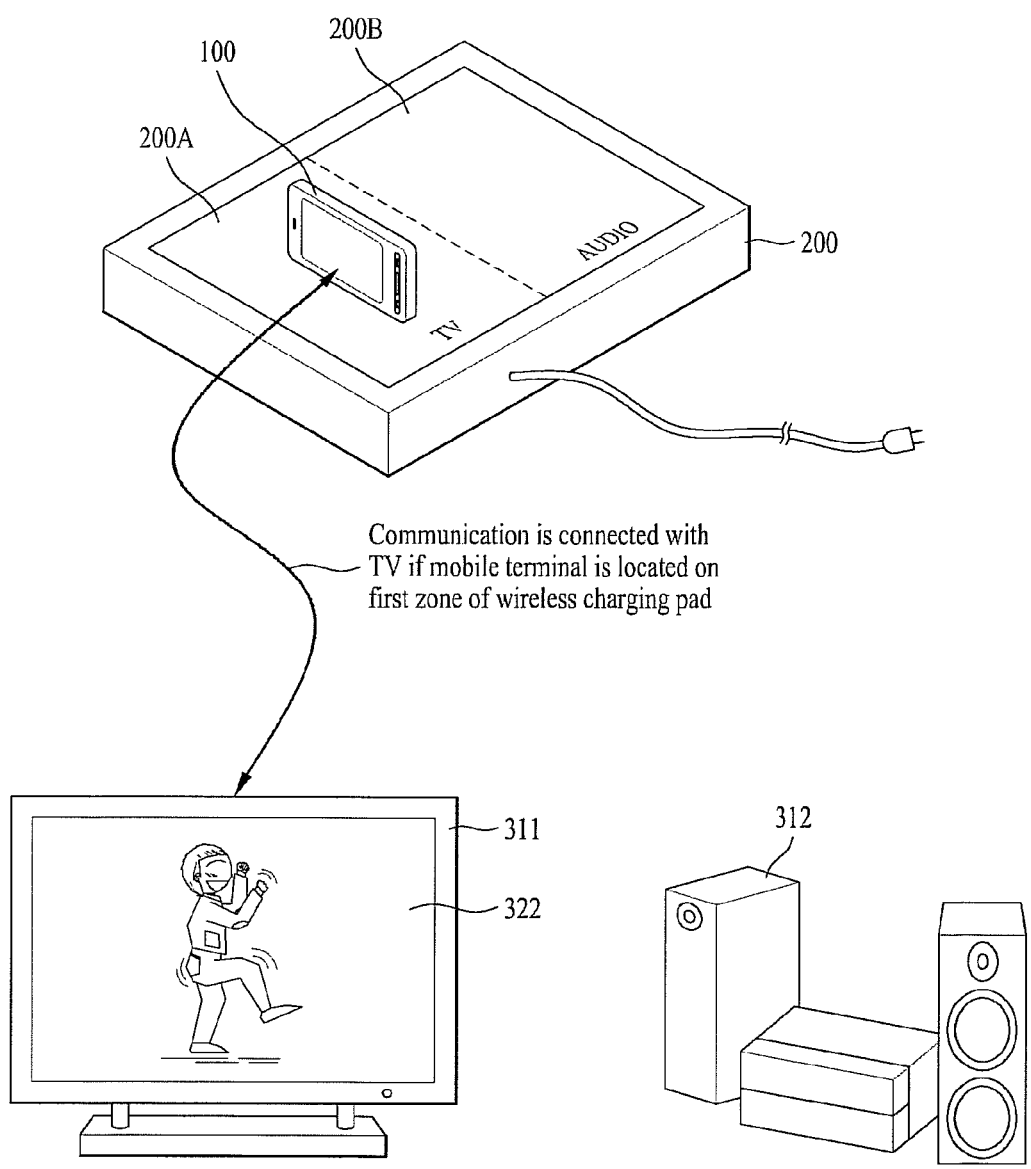
FIGS. 22 and 23 are screen state views illustrating a second embodiment of a process of connecting communication with an external device in accordance with a position of a mobile terminal with respect to a wireless charging pad.
Figure 23:
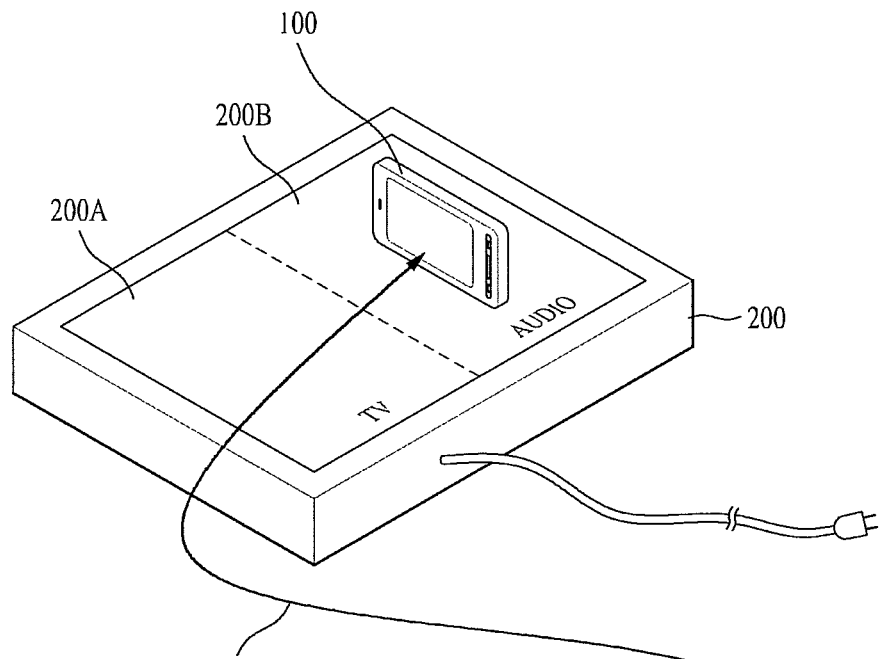
Figure 23:
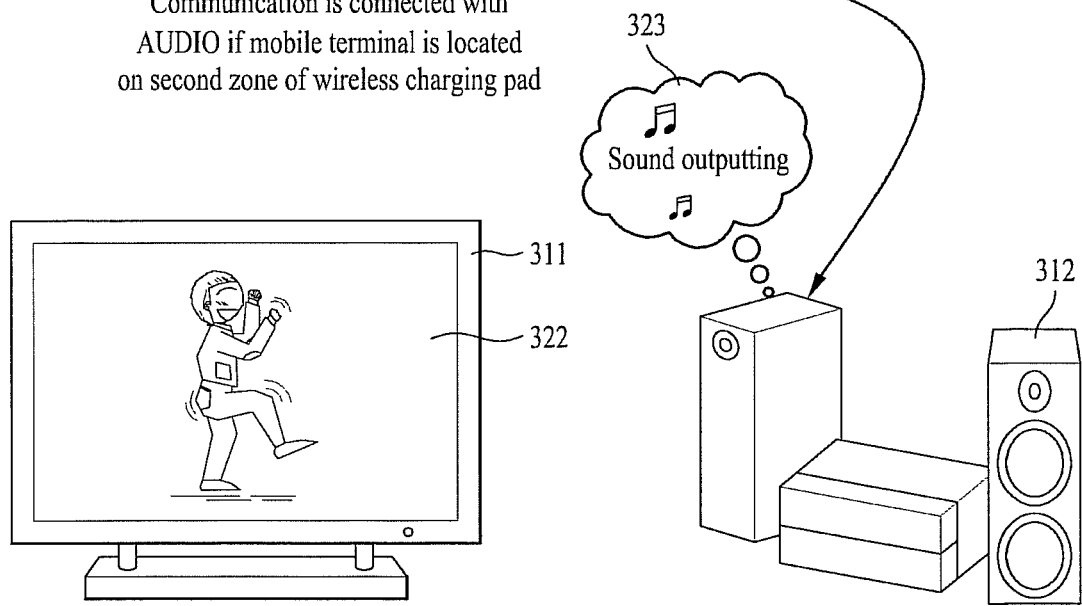

FIGS. 22 and 23 are screen state views illustrating a second embodiment of a process of connecting communication with an external device in accordance with a position of a mobile terminal with respect to a wireless charging pad.

Referring to FIGS. 21 to 23, the second controller 180 of the mobile terminal 100 senses whether the mobile terminal 100 is located on the wireless charging pad 200 [S211].

At this time, the second controller 180 can recognize that the mobile terminal 100 is located on the wireless charging pad 200 if the induction current type wireless charging power is input to the battery 190 through the second coil unit 194 and the charging unit 192.

Also, the second controller 180 can recognize that the mobile terminal 100 is located on the wireless charging pad 200 if position information of the mobile terminal 100 with respect to the wireless charging pad 200 is received from the wireless charging pad 200 through the second wireless communication unit 110.

If the mobile terminal 100 is located on the wireless charging pad 200 [S212], the second controller 180 starts to perform wireless charging of the battery 190 by controlling the second coil unit 194 and the charging unit 192 [S213].

As described with reference to FIGS. 2 and 3, the second controller 180 acquires the position information of the mobile terminal 100 with respect to the wireless charging pad 200 [S214].

In other words, the second controller 180 can acquire the position information of the mobile terminal by receiving the same from the wireless charging pad 200 through the second coil unit 194 and the charging unit 192 in accordance with the aforementioned process of FIGS. 2 and 3. Also, the second controller 180 can acquire the position information of the mobile terminal by receiving the same from the wireless charging pad 200 through the second wireless communication unit 110 in accordance with the aforementioned process of FIGS. 2 and 3.

In other words, the wireless charging pad 200 senses contact of the mobile terminal 100 arranged on the wireless charging pad 200 through the first sensing unit 220, and provides information on the position of the mobile terminal 100 contacted with the wireless charging pad 200 to the mobile terminal 100 through the wireless communication unit 210 or the first coil unit 240.

If the position information of the mobile terminal 100 is acquired from the wireless charging pad 200, the second controller 180 searches the external device set in the acquired position information from the table stored in the second memory 160 by the process of FIGS. 19 and 20 [S215].

The second controller 180 connects communication with the searched external device by controlling the second wireless communication unit 110 [S216] and performs various operations related to information sharing with the external device as shown in the process of FIGS. 8 to 18 [s217].

Referring to FIG. 22, if the wireless charging pad 200 senses through the first sensing unit 220 that the mobile terminal 100 is contacted with the first zone 200A of the wireless charging pad 200, it transmits the position information of the first zone 200A to the mobile terminal 100.

Also, the wireless charging pad 200 identifies one 240A of two or more coils 240A and 240B, which is paired with the second coil unit 194 of the mobile terminal 100, and transmits the position information of the first zone 200A in which the identified coil 240A is arranged, to the mobile terminal 100.

If the position information is received from the wireless charging pad 200, the mobile terminal 100 identifies the external device set in the position information within the table set by the process of FIGS. 19 and 20.

At this time, since the external device 311 (TV) is set in the first zone 200A of the wireless charging pad 200 of FIGS. 19 and 20, the mobile terminal 100 connects communication with the external device 311 (TV) of the external devices 311 and 312 located in the periphery thereof and performs various information sharing operations with the external device 311 (TV) in the same manner as the aforementioned process of FIGS. 8 to 18.

Also, referring to FIG. 23, if the mobile terminal 199 is arranged on the second zone 200B of the wireless charging pad 200, the mobile terminal 100 receives position information of the second zone 200B from the wireless charging pad 200 and connects communication with the external device 312 (AUDIO) set in the position information of the second zone 200B.

The mobile terminal 100 performs various information sharing operations with the external device 312 (AUDIO) in the same manner as the aforementioned process of FIGS. 8 to 18.

The second embodiment of the present invention has been described as above with reference to FIGS. 19 to 23.

Hereinafter, the third embodiment of the present invention will be described in detail with reference to FIGS. 24 and 25.

[Third Embodiment]

The third embodiment of the present invention relates to a process of connecting communication with an external device located at the front of a mobile terminal when a battery of the mobile terminal is charged through a wireless charging pad 200 and sharing information with the external device.

Hereinafter, the third embodiment of the present invention will be described in detail with reference to FIGS. 24 and 25.

Figure 24:
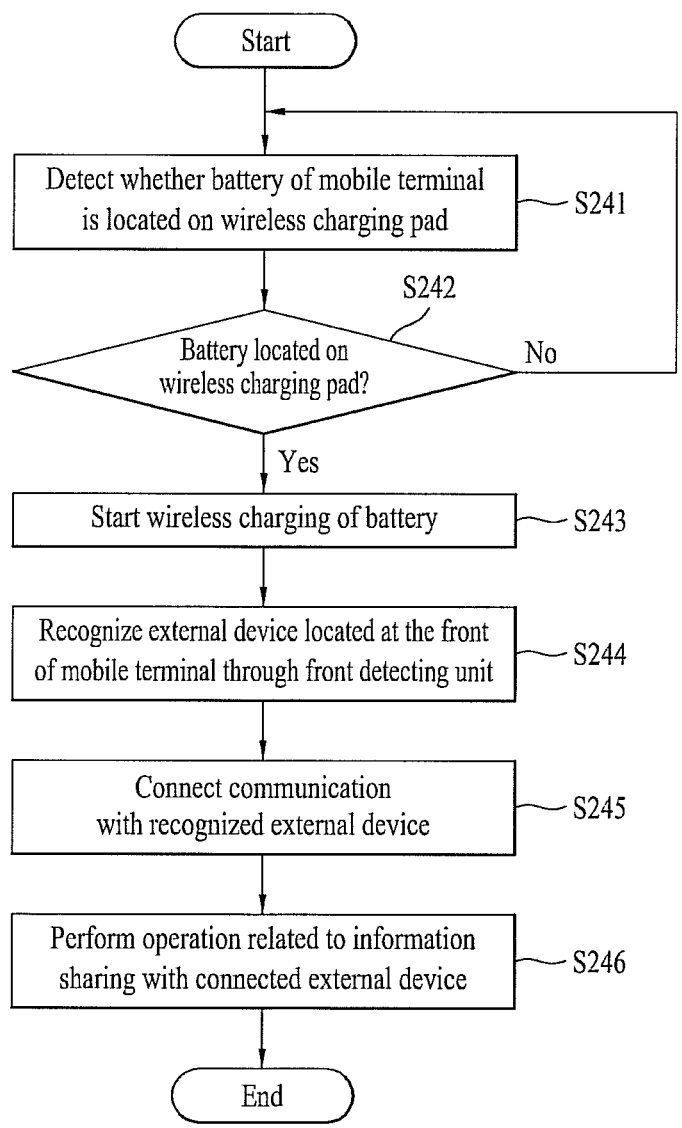
FIG. 24 is a flow chart illustrating a third embodiment of a process of connecting communication with an external device located at the front of a mobile terminal when a battery of the mobile terminal is charged through a wireless charging pad.

FIG. 24 is a flow chart illustrating a third embodiment of a process of connecting communication with an external device located at the front of a mobile terminal when a battery of the mobile terminal is charged through a wireless charging pad.

Figure 25:
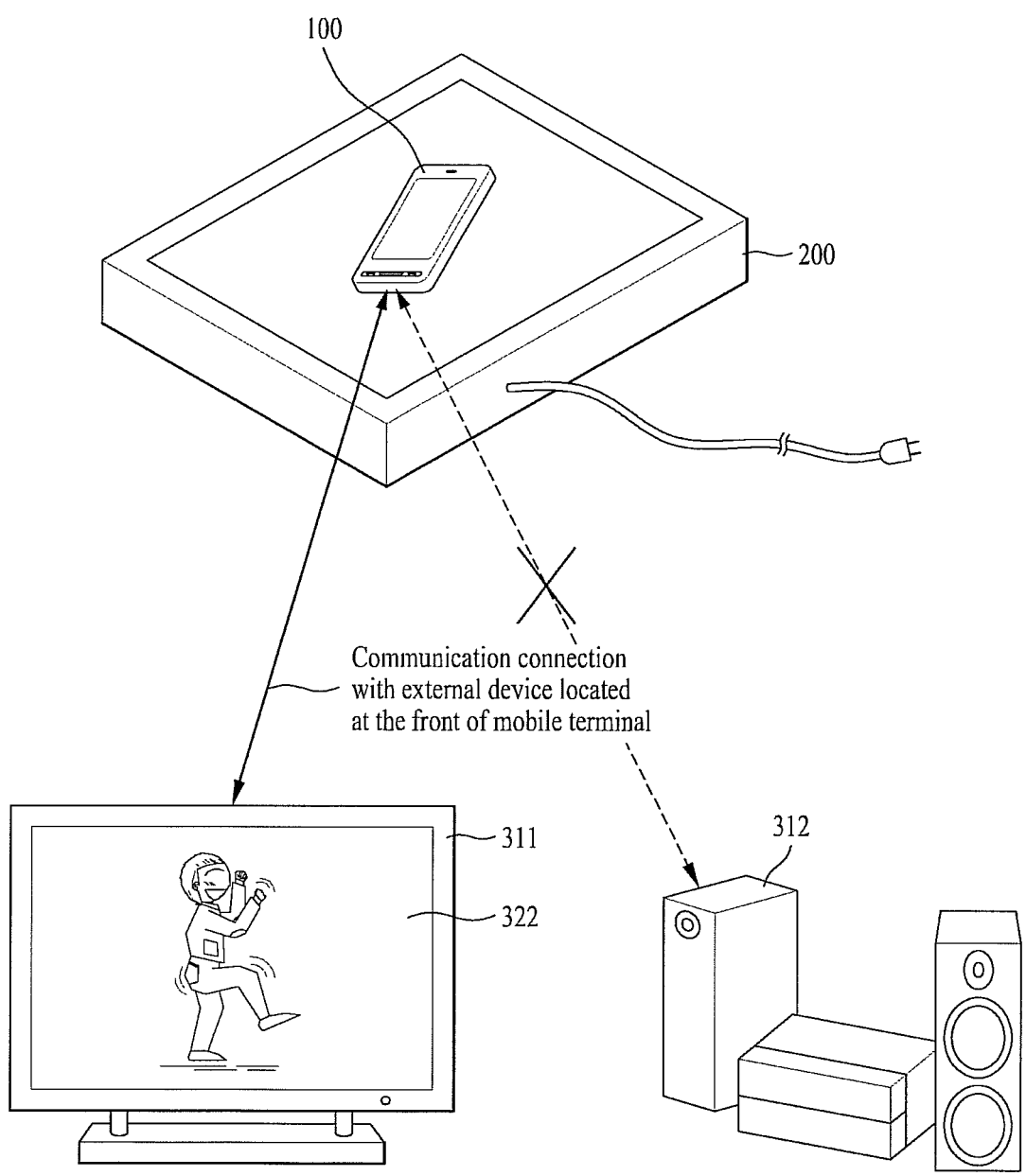
FIG. 25 is a screen state view illustrating a third embodiment of a process of connecting communication with an external device located at the front of a mobile terminal when a battery of the mobile terminal is charged through a wireless charging pad.

FIG. 25 is a screen state view illustrating a third embodiment of a process of connecting communication with an external device located at the front of a mobile terminal when a battery of the mobile terminal is charged through a wireless charging pad.

Referring to FIGS. 24 and 25, the second controller 180 of the mobile terminal 100 senses whether the mobile terminal 100 is located on the wireless charging pad 200 [S241].

If the mobile terminal 100 is located on the wireless charging pad 200 [S242], the second controller 180 starts to perform wireless charging of the battery 190 by controlling the second coil unit 194 and the charging unit 192 [S243].

The second controller 180 identifies one 311 of the external devices 311 and 312 located in the periphery of the mobile terminal 100, which is located at the front of the mobile terminal 100 which is being wireless-charged, by driving the front detecting unit 142 [S244].

If the external device 311 located at the front of the mobile terminal 100 is identified through the front detecting unit 142, the second controller 180 connects communication with the external device 311 by controlling the second wireless communication unit 110 [S245], and performs various operations related to information sharing with the external device 311 in the same manner as the aforementioned process of FIGS. 8 to 18 [S246][FIG. 25].

The third embodiment of the present invention has been described as above with reference to FIGS. 24 and 25.

Hereinafter, the fourth embodiment of the present invention will be described in detail with reference to FIGS. 26 to 29.

[Fourth Embodiment]

The fourth embodiment of the present invention relates to a process of implementing a function of a mobile terminal 100, which is previously set while a battery 190 of the mobile terminal 100 is being charged through a wireless charging pad 200.

Hereinafter, the fourth embodiment of the present invention will be described in detail with reference to FIGS. 26 to 29.

First of all, a process of setting a function to be performed when a battery 190 of a mobile terminal 100 is charged through a wireless charging pad 200 will be described with reference to FIGS. 26 and 27. However, the function may be set as default in the mobile terminal 100 without the process of FIGS. 26 and 27.

Figure 26:
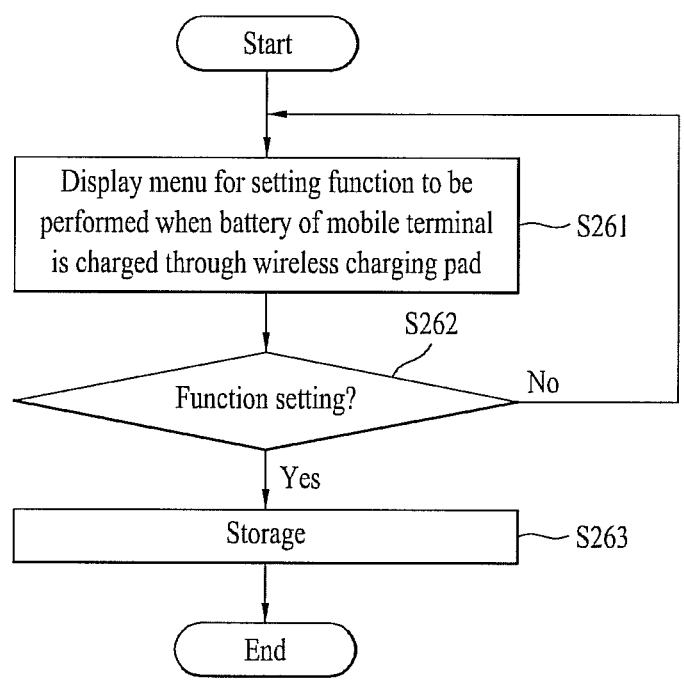
FIG. 26 is a flow chart illustrating a fourth embodiment of a process of setting a function to be performed by a mobile terminal when a battery of the mobile terminal is charged through a wireless charging pad in accordance with the present invention.

FIG. 26 is a flow chart illustrating a fourth embodiment of a process of setting a function to be performed by a mobile terminal when a battery of the mobile terminal is charged through a wireless charging pad in accordance with the present invention.

Figure 27:
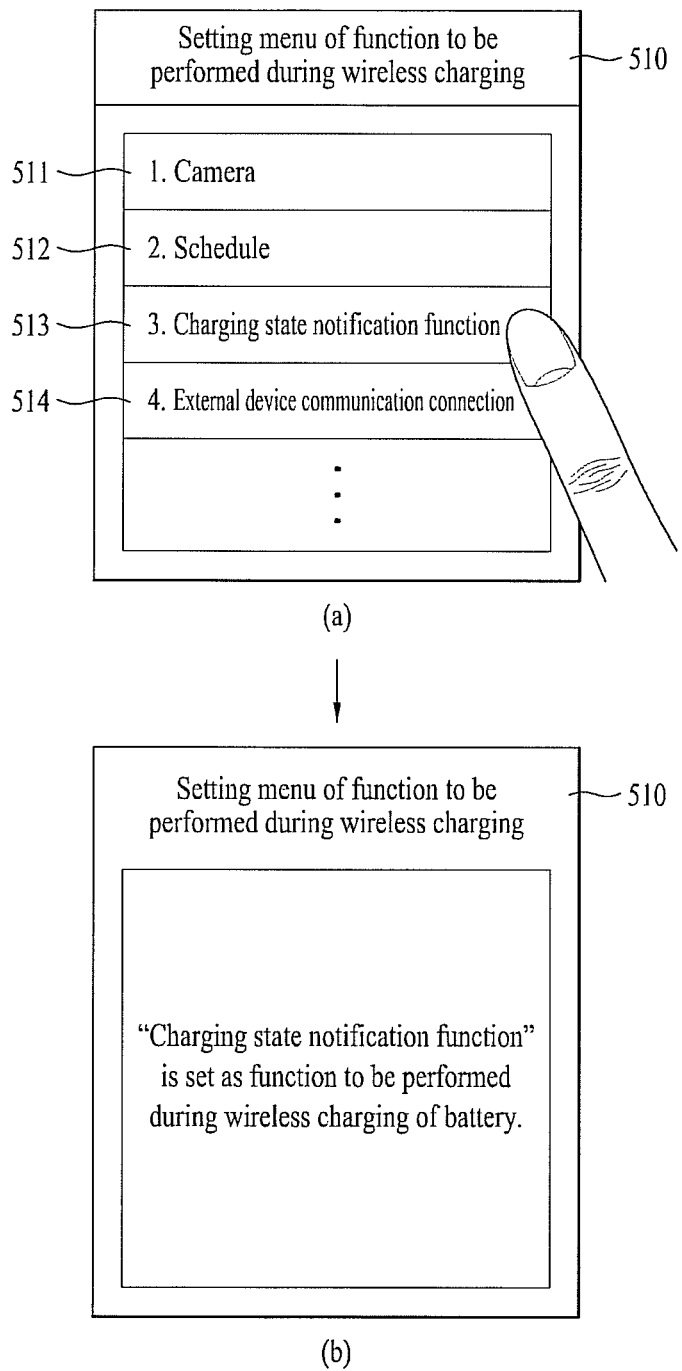
FIG. 27 is a screen state view illustrating a fourth embodiment of a process of setting a function to be performed by a mobile terminal when a battery of the mobile terminal is charged through a wireless charging pad in accordance with the present invention.

FIG. 27 is a screen state view illustrating a fourth embodiment of a process of setting a function to be performed by a mobile terminal when a battery of the mobile terminal is charged through a wireless charging pad in accordance with the present invention.

Referring to FIGS. 26 and 27, the second controller 180 of the mobile terminal 100 displays a menu 510, which sets a function to be performed when the battery 190 of the mobile terminal 100 is charged through the wireless charging pad 200, on the display module 151 in accordance with a request of the user [S261][(a) of FIG. 27].

At this time, the menu 510 is provided to set one or more of all menu functions provided in the mobile terminal 100 as those to be performed during wireless charging, such as phonebook display, camera driving, schedule display, incoming message display, recent call list display, image display, music play, and moving-picture play. And, the user can freely set a desired function through the menu 510.

Also, the functions to be performed during wireless charging may include a communication connection function with the external device described in the first to third embodiment of the present invention, FIGS. 5 to 25, or may include a charging state notification function of the battery 190.

For example, in (a) of FIG. 27, a function 513 indicating a charging state of the battery 190 as sound is set as the function to be performed during wireless charging.

As described above, if the functions to be performed during wireless charging are set through the menu 510 [S262][(a) of FIG. 27], the second controller 180 stores the set result in the second memory 160 [S263][(b) of FIG. 27].

Next, a process of implementing the functions set by the process of FIGS. 26 and 27 when the battery 190 of the mobile terminal 100 is wireless-charged will be described with reference to FIGS. 28 and 29.

Figure 28:
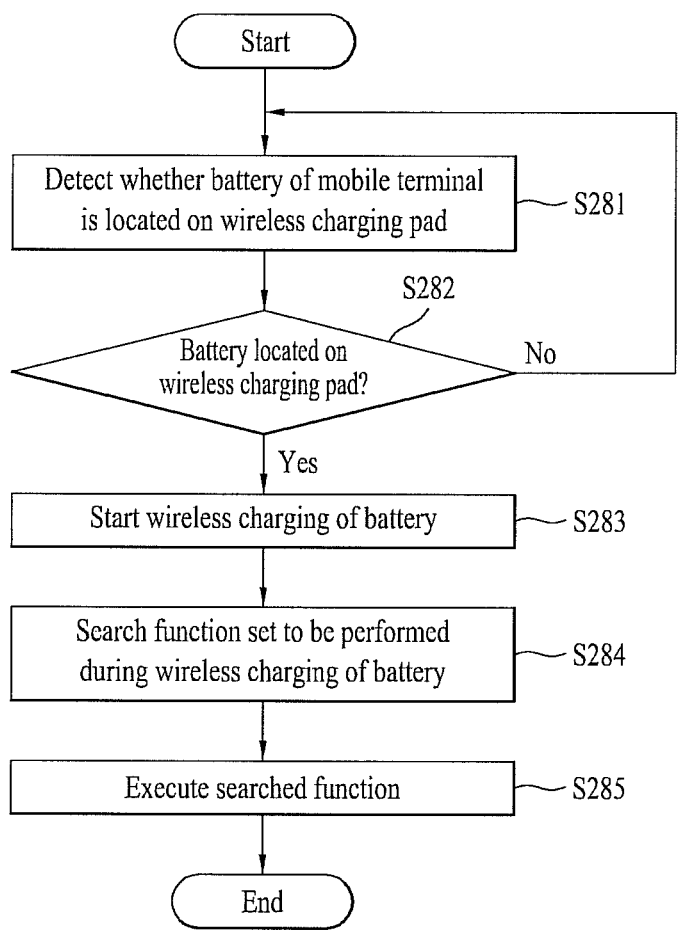
FIG. 28 is a flow chart illustrating a fourth embodiment of a process of performing a function which is previously set when a battery of a mobile terminal is charged through a wireless charging pad in accordance with the present invention.

FIG. 28 is a flow chart illustrating a fourth embodiment of a process of performing a function which is previously set when a battery of a mobile terminal is charged through a wireless charging pad in accordance with the present invention.

Figure 29:
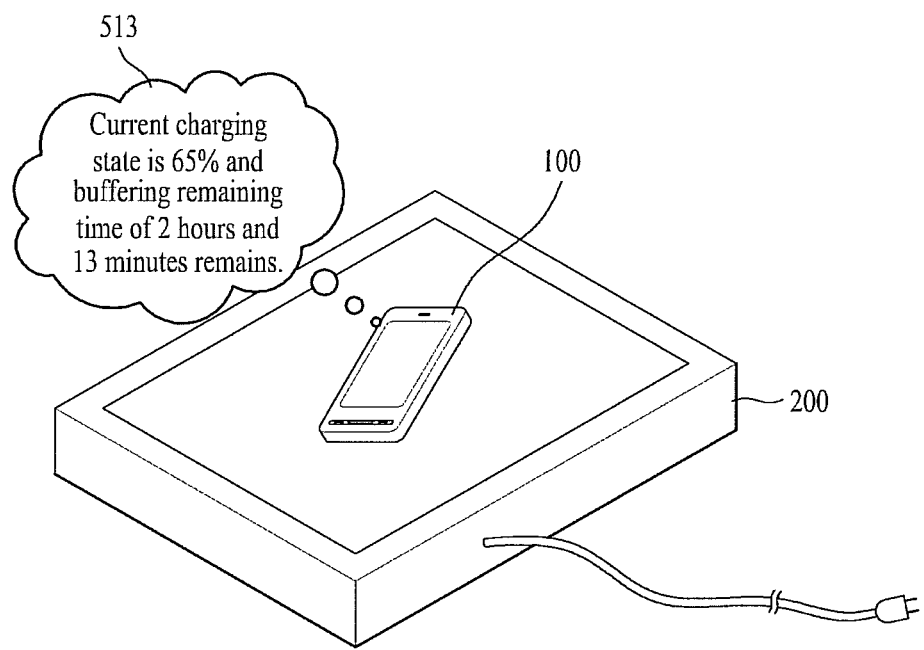
FIG. 29 is a screen state view illustrating a fourth embodiment of a process of performing a function which is previously set when a battery of a mobile terminal is charged through a wireless charging pad in accordance with the present invention.

FIG. 29 is a screen state view illustrating a fourth embodiment of a process of performing a function which is previously set when a battery of a mobile terminal is charged through a wireless charging pad in accordance with the present invention.

Referring to FIGS. 28 and 29, the second controller 180 of the mobile terminal 100 senses whether the mobile terminal 100 is located on the wireless charging pad 200 [S281].

If the mobile terminal 100 is located on the wireless charging pad 200 [S282], the second controller 180 searches the function set to be performed during wireless charging in the memory 160 [S284], and implements the searched function [S285].

In other words, referring to FIG. 29, since the function 513 indicating the charging state of the battery 190 as sound is set in FIG. 27 as the function to be performed during wireless charging of the battery 190, the second controller 180 implements the set function 513 during wireless charging of the battery 190.

The fourth embodiment of the present invention has been described as above with reference to FIGS. 26 to 29.

Hereinafter, the fifth embodiment of the present invention will be described in detail with reference to FIGS. 30 to 33.

[Fifth Embodiment]

The fifth embodiment of the present invention relates to a process of setting one or more functions to be performed by a mobile terminal for each of positions of one or more mobile terminals with respect to a wireless charging pad 200, and implementing a function corresponding to a position of the mobile terminal if the mobile terminal is located on the wireless charging pad.

Hereinafter, the fifth embodiment of the present invention will be described in detail with reference to FIGS. 30 to 33.

First of all, a process of respectively setting one or more functions of one or more mobile terminals for each of positions of one or more mobile terminals with respect to a wireless charging pad 200 will be described with reference to FIGS. 30 and 31.

Figure 30:
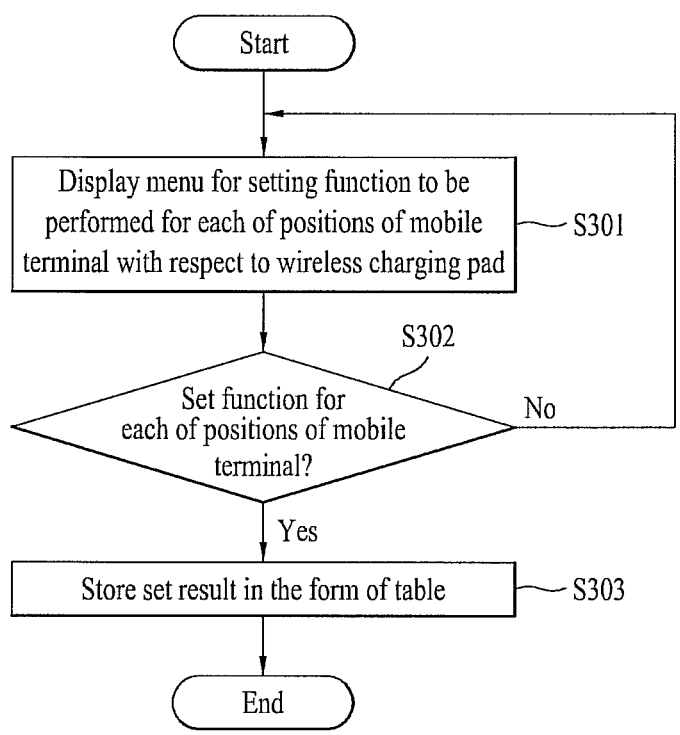
FIG. 30 is a flow chart illustrating a fifth embodiment of a process of respectively setting functions to be performed by one or more mobile terminals for each position of the mobile terminals with respect to a wireless charging pad.

FIG. 30 is a flow chart illustrating a fifth embodiment of a process of respectively setting functions to be performed by one or more mobile terminals for each position of the mobile terminals with respect to a wireless charging pad.

Figure 31:
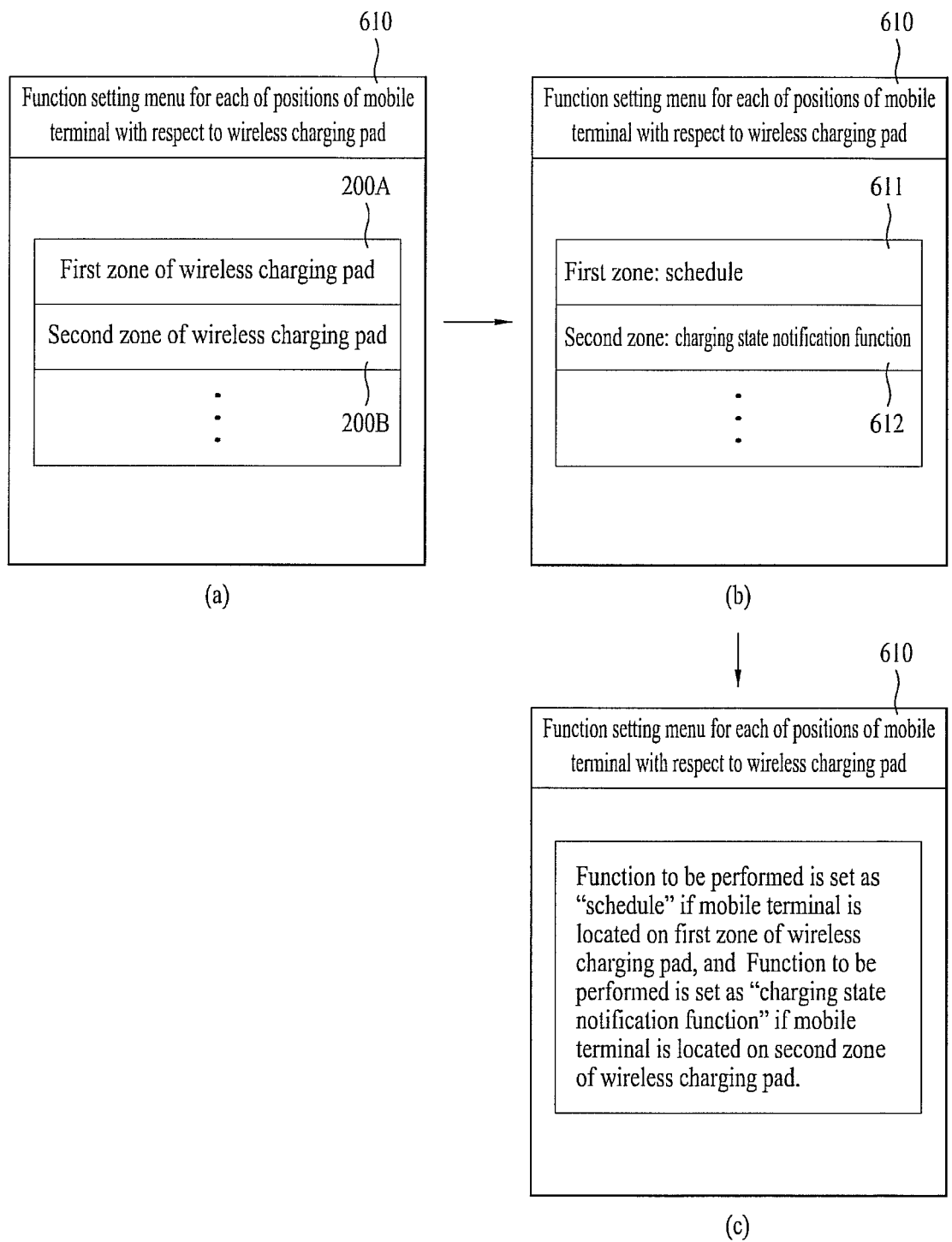
FIG. 31 is a screen state view illustrating a fifth embodiment of a process of respectively setting functions to be performed by one or more mobile terminals for each position of the mobile terminals with respect to a wireless charging pad.

FIG. 31 is a screen state view illustrating a fifth embodiment of a process of respectively setting functions to be performed by one or more mobile terminals for each position of the mobile terminals with respect to a wireless charging pad.

Referring to FIGS. 30 and 31, the second controller 180 of the mobile terminal 100 displays a menu 610, which respectively sets one or more functions 611 and 612 to be performed by the mobile terminal 100 for each of positions 200A and 200B of one or more mobile terminals with respect to the wireless charging pad 200, on the display module 151 in accordance with a request of the user [S301][(a) of FIG. 31].

If the functions [schedule function 611 and charging state notification function 612] to be performed by the mobile terminal 100 are set respectively for each of the positions (first zone 200A and second zone 200B of the wireless charging pad 200) of the mobile terminals with respect to the wireless charging pad through the menu 610 [S302][(a) and (b) of FIG. 31], the second controller 180 stores the set information in the second memory 160 in the form of table [S303] [(c) of FIG. 31].

Figure 32:
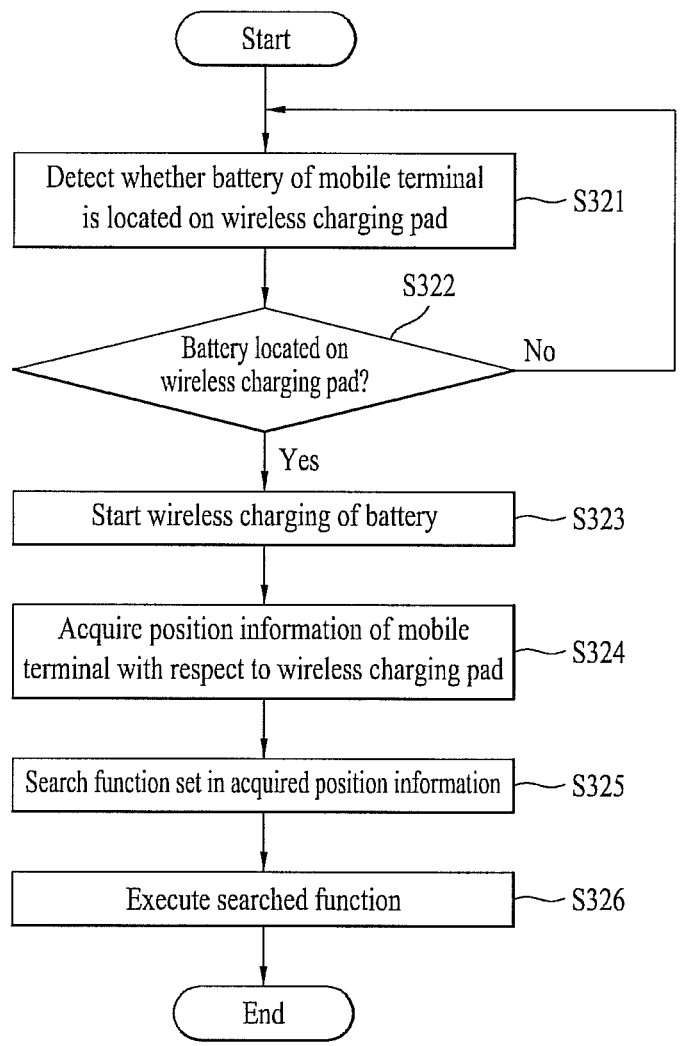
FIG. 32 is a flow chart illustrating a fifth embodiment of a process of performing a function based on a position of a mobile terminal with respect to a wireless charging pad.

FIG. 32 is a flow chart illustrating a fifth embodiment of a process of performing a function based on a position of a mobile terminal with respect to a wireless charging pad.

Figure 33:
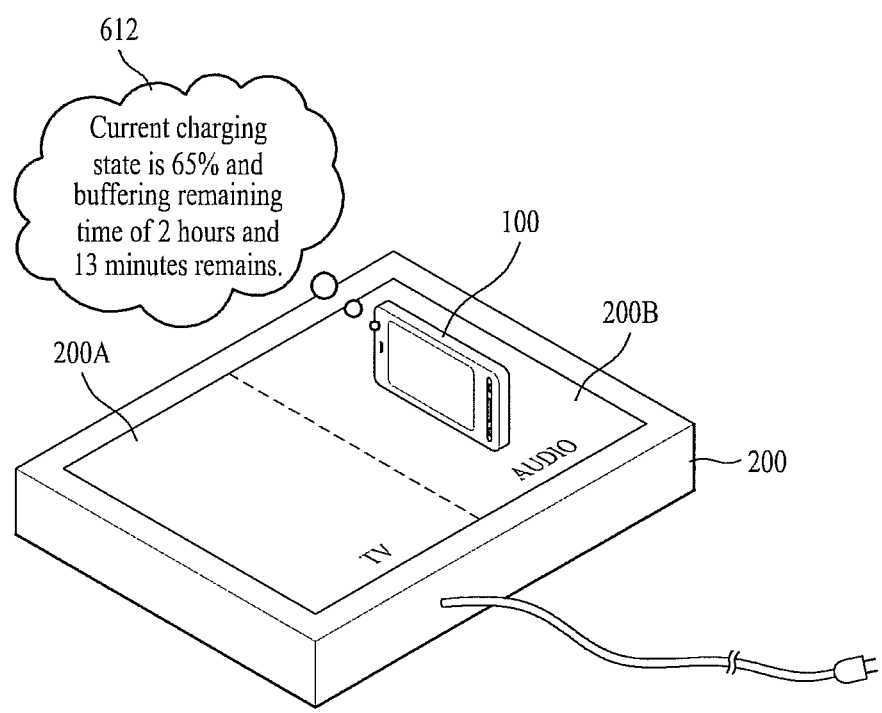
FIG. 33 is a screen state view illustrating a fifth embodiment of a process of performing a function based on a position of a mobile terminal with respect to a wireless charging pad.

FIG. 33 is a screen state view illustrating a fifth embodiment of a process of performing a function based on a position of a mobile terminal with respect to a wireless charging pad.

Referring to FIGS. 32 and 33, the second controller 180 of the mobile terminal 100 senses whether the mobile terminal 100 is located on the wireless charging pad 200 [S321].

If the mobile terminal 100 is located on the wireless charging pad 200 [S322], the second controller 180 starts to perform wireless charging of the battery 190 by controlling the second coil unit 194 and the charging unit 192 [S323].

As described with reference to FIGS. 2 and 3, the second controller 180 acquires position information of the mobile terminal 100 with respect to the wireless charging pad 200 [S324].

In other words, the second controller 180 can acquire the position information of the mobile terminal by receiving the same from the wireless charging pad 200 through the second coil unit 194 and the charging unit 192 in accordance with the aforementioned process of FIGS. 2 and 3. Also, the second controller 180 can acquire the position information of the mobile terminal by receiving the same from the wireless charging pad 200 through the second wireless communication unit 110 in accordance with the aforementioned process of FIGS. 2 and 3.

In other words, the wireless charging pad 200 senses contact of the mobile terminal 100 arranged on the wireless charging pad 200 through the first sensing unit 220, and provides information on the position of the mobile terminal 100 contacted with the wireless charging pad 200 to the mobile terminal 100 through the wireless communication unit 210 or the first coil unit 240.

If the position information of the mobile terminal 100 is acquired from the wireless charging pad 200, the second controller 180 searches the function set in the acquired position information from the table stored in the second memory 160 by the process of FIGS. 30 and 31 [S325], and implements the searched function [S326].

Referring to FIG. 33, if the wireless charging pad 200 senses through the first sensing unit 220 that the mobile terminal 100 is contacted with the second zone 200B of the wireless charging pad 200, it transmits position information of the second zone 200B to the mobile terminal 100.

Also, the wireless charging pad 200 identifies one 240A of two or more coils 240A and 240B, which is paired with the second coil unit 194 of the mobile terminal 100, and transmits the position information of the second zone 200B in which the identified coil 240A is arranged, to the mobile terminal 100.

If the position information is received from the wireless charging pad 200, the mobile terminal 100 searches the function set in the position information within the table set by the process of FIGS. 30 and 31.

At this time, since the function 612 indicating the charging state of the battery 190 as sound is set in the second zone 200B of the wireless charging pad 200 of FIGS. 30 and 31, the mobile terminal 100 implements the function 612.

As described above, the mobile terminal according to the present invention and the method for controlling the same have the following effects and/or advantages.

First of all, the present invention can connect communication with the external device, which is previously set, when the battery of the mobile terminal is charged through the wireless charging pad, and can output the information of the mobile terminal through the connected external device.

Second, the present invention can connect any one of different external devices in accordance with the position of the mobile terminal with respect to the wireless charging pad when the battery of the mobile terminal is charged through the wireless charging pad, and can output the information of the mobile terminal through the connected external device.

Third, the present invention can connect the external device located at the front of the mobile terminal when the battery of the mobile terminal is charged through the wireless charging pad, and can output the information of the mobile terminal through the connected external device.

Fourth, the present invention can implement the function of the mobile terminal, which is previously set, when the battery of the mobile terminal is charged through the wireless charging pad.

Finally, the present invention can implement any one of different functions of the mobile terminal in accordance with the position of the mobile terminal with respect to the wireless charging pad when the battery of the mobile terminal is charged through the wireless charging pad.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
a display for displaying information;
a wireless communication unit for wireless communication;
a charging unit to receive a wireless charging power from a wireless charging pad and to charge a battery of the mobile terminal based on the received wireless charging power while the mobile terminal is located on the wireless charging pad;
a coil unit to receive an induction current corresponding to position information of the mobile terminal with respect to the wireless charging pad from the wireless charging pad while the battery is being charged, the position information indicates that the mobile terminal is located on one of a plurality of zones on the wireless charging pad; and
a controller configured to:
recognize the received induction current as the position information of the mobile terminal,
control the wireless communication unit to connect a wireless communication with an external device previously mapped to the recognized position information, and
control an information sharing operation with the external device while the mobile terminal is located on the wireless charging pad.

2. The mobile terminal of claim 1, wherein the controller is further configured to:
receive device information of the external terminal from the external terminal via the wireless communication unit when the wireless communication with the external terminal is connected,
search a memory of the mobile terminal for at least one content, which is executed in the external terminal, based on the received device information, and
control the wireless communication unit to transmit the searched content to the external terminal to execute the searched content.

3. The mobile terminal of claim 1, wherein the controller controls the information sharing operation when the display is powered on, and the controller stops the information sharing operation when the display is powered off.

4. The mobile terminal of claim 1, wherein the controller controls transmission of low voltage information to the external device when a charging efficiency of the battery is less than a reference value, and the controller stops the information sharing operation when the charging efficiency of the battery is less than the reference value.

5. The mobile terminal of claim 1, wherein the controller controls transmission of battery charging information to the external device, the battery charging information indicating a charging ongoing state of the battery per period.

6. The mobile terminal of claim 1, wherein the display is a touch screen type, and while the battery is being charged by the wireless charging pad, the controller displays a user interface on the display, the displayed user interface including a plurality of operation control keys for controlling each of a plurality of operations of the external device, and when a specific operation control key of the user interface is selected, the controller controls transmission of a command signal to the external device, the transmitted command signal for commanding an operation corresponding to the selected operation control key.

7. The mobile terminal of claim 1, wherein when a specific event occurs while the battery is being charged, the controller transmits information relating to the event to the external device.

8. A method for controlling a mobile terminal, the method comprising:
receiving, from a wireless charging pad via a charging unit of the mobile terminal, a wireless charging power while the mobile terminal is located on the wireless charging pad;
charging, via the charging unit, a battery of the mobile terminal based on the received wireless charging power;
receiving, from a wireless charging pad via a coil unit of the mobile terminal, an induction current corresponding to position information of the mobile terminal with respect to the wireless charging pad while the battery is charging, wherein the received position information indicates that the mobile terminal is located on one of a plurality of zones on the wireless charging pad;
recognizing the received induction current as the position information of the mobile terminal;
connecting a wireless communication with an external device previously mapped to the recognized position information while the battery is charging; and
controlling an information sharing operation with the external device while the mobile terminal is located on the wireless charging pad.

9. The method of claim 8, further comprising:
receiving device information of the external terminal from the external terminal when the wireless communication with the external terminal is connected;
searching a memory of the mobile terminal for at least one content, which is executed in the external terminal, based on the received device information; and
transmitting the searched content to the external terminal to execute the searched content.

10. The method of claim 8, wherein the information sharing operation is performed when a display is powered on, and the information sharing operation stops when the display is powered off.

11. The method of claim 8, wherein controlling the information sharing operation includes transmitting low voltage information to the external device when a charging efficiency of the battery is less than a reference value, and the information sharing operation stops when the charging efficiency of the battery is less than the reference value.

12. The method of claim 8, wherein controlling the information sharing operation includes transmitting battery charging information to the external device, the battery charging information indicating a charging ongoing state of the battery per period.

13. The method of claim 8, wherein while the battery is being charged by the wireless charging pad, a user interface is displayed on a display, the displayed user interface including operation control keys for controlling each of a plurality of operations of the external device, and when a specific operation control key within the user interface is selected, a command signal is transmitted to the external device, the transmitted command signal for commanding an operation corresponding to the selected operation control key.

14. The method of claim 8, wherein when a specific event occurs while the battery is being charged, the mobile terminal transmits information relating to the event to the external device.

15. A mobile terminal comprising:
   a display for displaying information;
   a wireless communication unit for wireless communication;
   a charging unit to receive a wireless charging power from a wireless charging pad and to charge a battery of the mobile terminal based on the received wireless charging power while the mobile terminal is located on the wireless charging pad;
   a coil unit to receive an induction current corresponding to position information of the mobile terminal with respect to the wireless charging pad from the wireless charging pad while the battery is being charged, the position information indicates that the mobile terminal is located on one of a plurality of zones on the wireless charging pad; and
   a controller configured to:
      recognize the received induction current as the position information of the mobile terminal, and
      perform a preset function previously mapped to the recognized position information.

16. The mobile terminal of claim 15, further comprising:
   a memory to store information regarding a plurality of preset functions mapped to a plurality of position information of the mobile terminal relative to the wireless charging pad,
   wherein the controller performs the preset function mapped to the acquired position based on the information stored in the memory.

17. The mobile terminal of claim 15, wherein the preset function is an information sharing function with an external device, and the controller controls the wireless communication unit to provide the wireless communication with the external device based on the recognized position information, and the controller controls the information sharing operation with the external device.

18. The mobile terminal of claim 15, wherein the preset function is a menu function provided by the mobile terminal, and the controller performs a preset menu function corresponding to the recognized position information.

19. A method for controlling a mobile terminal, the method comprising:
   receiving, from a wireless charging pad via a charging unit of the mobile terminal, a wireless charging power while the mobile terminal is located on the wireless charging pad;
   charging, via the charging unit, a battery of the mobile terminal based on the received wireless charging power;
   receiving, from a wireless charging pad via a coil unit of the mobile terminal, an induction current corresponding to position information of the mobile terminal with respect to the wireless charging pad while the battery is charging, the position information indicates that the mobile terminal is located on one of a plurality of zones on the wireless charging pad;
   recognizing the received induction current as the position information of the mobile terminal; and
   performing a preset function previously mapped to the recognized position information.

20. The method of claim 19, further comprising storing information, in a memory, regarding a plurality of functions mapped to a plurality of position information of the mobile terminal, and
   wherein performing the preset function includes performing the function mapped to the acquired position based on the information stored in the memory.

21. The method of claim 19, wherein the preset function is an information sharing function with an external device, and a wireless communication is provided with the external device when the position information is received, and the controller controls an operation related to the information sharing function with the external device.

22. The method of claim 19, wherein the preset function is a menu function provided by the mobile terminal, and performing the preset function includes performing a preset menu function corresponding to the received position information.

* * * * *